United States Patent [19]

Eccher et al.

[11] Patent Number: 5,401,026
[45] Date of Patent: * Mar. 28, 1995

[54] METHOD AND APPARATUS FOR DETERMINING PARAMETERS OF THE MOTION OF AN OBJECT

[75] Inventors: Daniel J. Eccher, Loveland; James P. Thome, Fort Collins; David L. Basinger, Loveland, all of Colo.

[73] Assignee: Blackfox Technology Group, Loveland, Colo.

[*] Notice: The portion of the term of this patent subsequent to Sep. 21, 2010 has been disclaimed.

[21] Appl. No.: 85,303

[22] Filed: Jun. 29, 1993

Related U.S. Application Data

[63] Continuation-in-part of Ser. No. 823,849, Jan. 22, 1992, Pat. No. 5,246,232.

[51] Int. Cl.⁶ .................................................. A63B 69/36
[52] U.S. Cl. ............................. 273/184 R; 273/186.1; 273/183.1; 342/109; 342/118
[58] Field of Search ............. 273/183.1, 184 R, 185 R, 273/186.1, 186.2, 186.3, 25, 26 R, 29 R; 342/104, 107, 109, 118, 127, 134, 135

[56] References Cited

U.S. PATENT DOCUMENTS

| | | | |
|---|---|---|---|
| 3,438,031 | 4/1969 | Fathauer | 343/8 |
| 3,508,440 | 4/1970 | Murphy | 73/379 |
| 3,938,809 | 2/1976 | Gentiluomo | 273/176 |
| 4,137,566 | 1/1979 | Haas et al. | 273/183.1 |
| 4,276,548 | 6/1981 | Lutz | 343/7 |
| 4,545,576 | 10/1985 | Harris | 273/25 |
| 4,673,183 | 6/1987 | Trahan | 273/185 R |
| 4,858,922 | 1/1992 | Santavaci | 273/26 |
| 5,082,263 | 1/1992 | Berger | 273/61 R |
| 5,092,602 | 3/1992 | Witler et al. | 273/184 R |
| 5,246,232 | 9/1993 | Eccher et al. | 273/186.1 |

OTHER PUBLICATIONS

"DistanceCaddy" advertising brochure distributed by Colorado Time Systems, Inc.

Primary Examiner—Jessica J. Harrison
Attorney, Agent, or Firm—Sheridan Ross & McIntosh

[57] ABSTRACT

The present invention provides a method and apparatus for determining a desired parameter of the motion of an object. In one embodiment, the device can be used to calculate the estimated carry distance of a golf shot. The golfer uses a keypad to enter the golf club and the units of measure for the output display. A Doppler radar system is employed to illuminate the golf ball. A reflected return signal is detected and difference pulses are generated, having a frequency which is proportional to the velocity of the ball. The difference pulses are processed by a microprocessor to determine if the radar beam has "locked" onto the ball. If so, the microprocessor calculates the carry distance by relating the average period of the difference pulses to a projected carry distance through empirically determined data. The carry distance can be displayed on the device, on a remote display, and/or can be stored in memory for later recall or transmission to an external computer. The microprocessor can also be used to determine if the difference pulses it receives are related to the motion of a ball struck by the user of the apparatus by comparing incoming data to characteristic patterns of club-head movement and can be programmed to calculate and display the angle of trajectory and speed of the ball and club-head speed and swing tempo. Also, an acoustic trigger or electric eye can be used to activate the apparatus when the golf ball is struck.

27 Claims, 16 Drawing Sheets

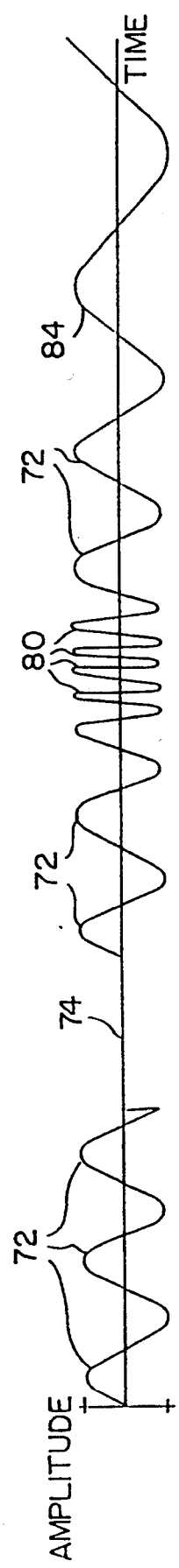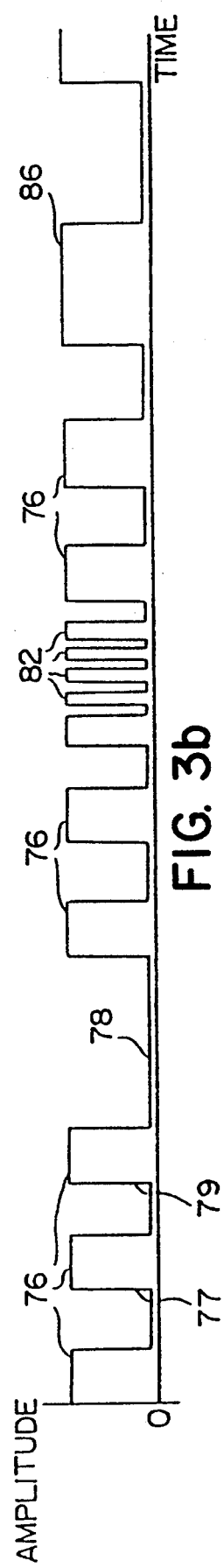
FIG. 3a
FIG. 3b

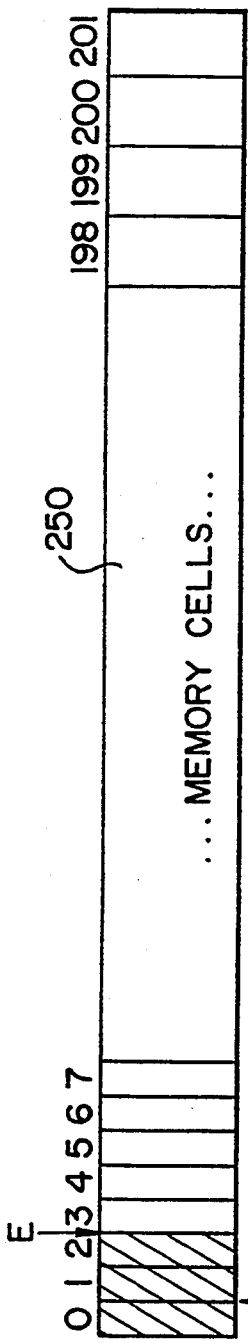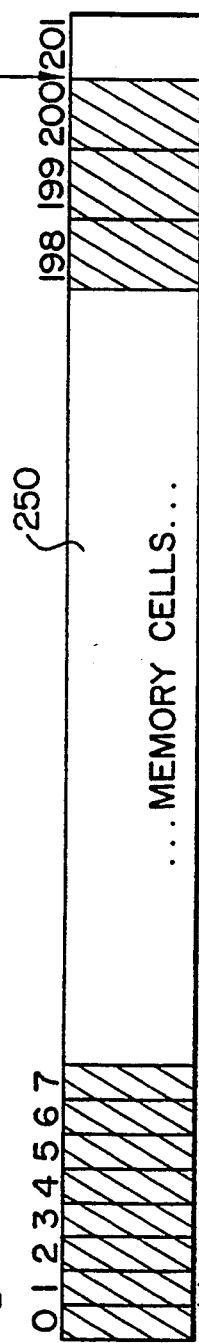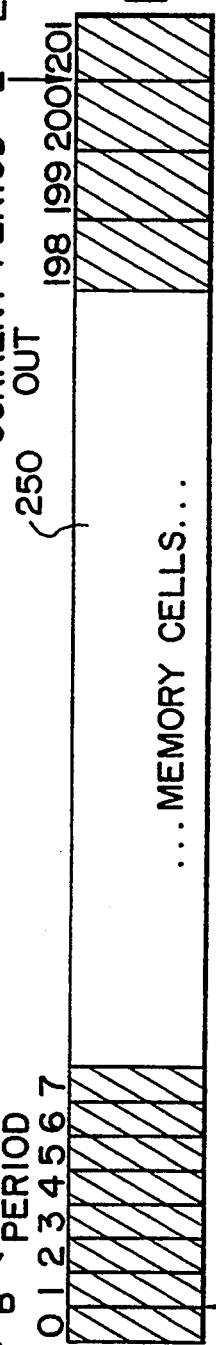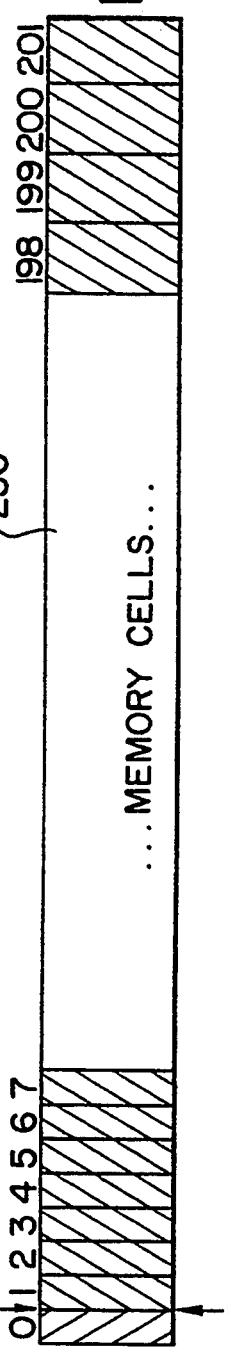

METHOD AND APPARATUS FOR DETERMINING PARAMETERS OF THE MOTION OF AN OBJECT

RELATED APPLICATIONS

This application is a continuation-in-part of U.S. patent application Ser. No. 07/823,849, filed Jan. 22, 1992, U.S. Pat. No. 5,246,232, and a continuation-in-part of PCT Application No. US/93/00570 both of which are hereby incorporated by reference.

TECHNICAL FIELD OF THE INVENTION

This invention relates to a method and apparatus for determining desired parameters of the motion of an object, such as, for example, the estimated carry distance of a golf ball.

BACKGROUND OF THE INVENTION

Various methods and apparatus have been devised for measuring characteristics of the motion of an object, such as velocity, estimated distance the object will travel ("carry distance"), spin, momentum, and trajectory. Radar devices have been developed which utilize the Doppler frequency shift to measure the velocity of the moving object. Very briefly, electromagnetic energy, such as microwave radar energy, which is transmitted toward and reflected by a moving object undergoes a frequency shift, the magnitude of which is proportional to the velocity of the object relative to the transmitter. Samples of the transmitted and reflected radiation are mixed and processed to obtain a difference signal having a frequency which is equal to the difference between the transmitted and reflected frequencies, this difference being the Doppler shift. Once the difference frequency has been obtained, the relative velocity of the object can be readily calculated.

Many Doppler radar devices count the number of pulses in the difference signal during a predetermined period of time or "window." If the width of the window (i.e., the period of time) is chosen properly, the number of pulses which are counted will equal the velocity of the object in the desired units (such as miles per hours or kilometers per hour). To determine the width of the window, it is necessary to apply the following formula:

$$f_d = (2 f_t v_r)/v_c$$

where $f_d$ is the Doppler frequency; $f_t$ is the frequency of the transmitted radiation; $v_r$ is the relative velocity of the object; and $v_c$ is the velocity of light in appropriate units. For a transmission frequency $f_t$ of about 10.5 GHz (a typical operating frequency for Doppler radar), $f_d$ equals about 31.3 $v_r$ (in miles per hour). The width of the window is the inverse of 31.3, or about 31.9 milliseconds, and the number of difference frequency pulses counted will give the object's velocity in miles per hour. For example, an object moving 100 miles per hour would produce a signal with a Doppler difference frequency of about 3,130 Hz. The number of pulses in the signal counted during a window having a width of 31.9 milliseconds is about 100, which is the velocity of the object in miles per hour.

A significant disadvantage of pulse counting to obtain the velocity of an object is that signal "drop-outs", noise and other interference may increase or decrease the actual number of pulses counted during the window period, thereby degrading the accuracy of the device. For reasons which are not fully known, a portion of the reflected signal may not be detected, leading to periods during which no pulses are received (drop-out periods). Additionally, noise can introduce false pulses, thereby increasing the number counted. While various filtering techniques have been proposed to reduce the effects of noise, they may not be completely effective and may have little or no ability to offset the effects of signal drop out.

Many Doppler radar devices employ phase lock loop (PLL) circuitry to "lock" onto the difference frequency and to generate a voltage which is proportional to the Doppler frequency. Additionally, an internal oscillator is synchronized with the frequency of the difference signal and provides an output signal at that frequency. The status of the constant voltage output can be used to determine when the PLL has locked onto the moving object (i.e. when the oscillator becomes synchronized with the difference signal). When synchronization occurs, the constant voltage output can be used to initiate the counting of pulses from the oscillator during the predetermined window.

When a PLL Doppler radar device is on, the PLL generates an output signal regardless of whether a lock has not been achieved. This signal, which resembles random noise, can, in some circumstances, make it difficult for a lock to be accomplished. Additionally, such a device typically requires many components and may, in fact, have to be fabricated on several circuit boards. This raises reliability issues related to the quality control of parts and production. It can be appreciated that a relatively high failure rate can result in increased production costs when faulty units are rebuilt, repaired or simply discarded.

Many Doppler radar devices employ a resistive/-capacitive (RC) network in order to establish the width of the timing window. Using known equations, the values of the components in the RC network can be calculated to enable a capacitor to charge to a predetermined level, thereby activating or deactivating a counter. Precise and expensive components are necessary to provide a very accurate system; even when precision components are employed, accuracy may suffer due to age, heat and the like. Crystal controlled timing circuits are generally more accurate but may be more expensive than an RC network and may require additional components to produce usable timing pulses.

Both methods of establishing a window width have the common disadvantage of being relatively inflexible when more than one window width is desired. For example, if velocity is desired in units of kilometers per hours rather than miles per hour, the window width should be about 5.1 milliseconds for a transmission frequency of about 10.5 GHz. Consequently, some means, such as additional timing circuitry, must be included to allow the desired units to be selected.

Another application in which it is desirable to select from among different window widths involves the use of a Doppler radar device to calculate the distance an object can be expected to travel. For example, during custom golf club fitting or during golf training and practice, it can be useful to know how far a golf ball will travel ("carry distance"). During golf club fitting, the golfer can try out different sized clubs and clubs from different manufacturers to determine which will enable him or her to consistently hit the farthest. During lessons or practice, a golfer can change his or her grip, stance or swing in order to adjust or maximize the carry distance of the golf ball. It can be appreciated, therefore, that accurate information about the ball's carry distance would be extremely useful. It would also be useful to be able to obtain such information indoors in a relatively small enclosed space.

A further disadvantage to counting pulses during a window period is that the ball may be near or beyond the range of the device before the end of the window, making the device more susceptible to noise and interference and reducing its accuracy. Increasing the range of the device, such as by increasing its power output or the input gain, may be expensive or impractical and may cause the device to be more sensitive to moving objects other than the desired target.

In fact, one of the biggest problems with prior art devices which measure the carry distance of a golf ball is that moving objects other than the desired target often cause inaccurate readings. For instance, if such a device were used at a driving range and someone nearby hit a ball into the path of the transmitted radiation, a prior art device would have no way to distinguish that ball from a ball hit by the user of the device. This could cause the PLL to lock on to the wrong ball or even prevent a lock altogether. In addition, since prior art devices do not include means to isolate only the motion of the appropriate golf ball, these devices are placed beside the teed golf ball rather than behind it, so that the motion of the club head does not affect the readings. Placing the device beside the golfer can reduce the accuracy of a distance measurement based on relative velocity. In addition, from a position beside the golfer, a prior art device may not be able to track a shot hit with a great deal of loft which is outside of the cone of transmitted radiation.

Consequently, it is desirable to provide increased accuracy with a single radar unit having selectable parameters without relying on fixed timing windows and without employing an excessive number of circuit components. It is also desirable for such a device to be faster, more accurate, and less susceptible to noise and drop-outs than existing devices. Finally, it would be advantageous for such a device to be capable of determining whether received data is related to the appropriate moving object, so as to obviate the effects of other moving objects within the unit's range.

SUMMARY OF THE INVENTION

In accordance with the present invention, a method and an apparatus are provided for determining a desired parameter of the motion of the object. The method and apparatus of the present invention can be employed to determine a number of parameters regarding the motion of a variety of moving objects including, for example, vehicles and other craft, runners, and thrown or struck balls. The present invention is particularly applicable to estimating the carry distance of a golf ball after being struck by a golf club, even if the ball is hit indoors into a net only a short distance from the golfer.

The apparatus of the present invention enables a method which includes the steps of causing a golf ball to move by striking it with a golf club, reflecting radiation off of the golf ball after it is in motion, positioning a receiver in such a location that it is capable of receiving the reflected radiation, obtaining a sequence of difference pulses having a frequency substantially inversely proportional to the velocity of the moving golf ball, determining values corresponding to the periods of the pulses, and using the values to calculate the desired parameter. The step of determining the period of the difference pulses can include the steps of comparing the deviation between the periods of two consecutive difference pulses with a predetermined range of acceptable deviations, and calculating the average period of the pulses. The method can further comprise the step of ascertaining whether the sequence of difference pulses is sufficiently stable to enable the period to be determined; i.e., whether a "lock" has been achieved. Additionally, the method of the present invention can include the step of storing the calculated parameter and the selected club type in a memory device, such as a nonvolatile memory device. The calculated parameter can be displayed and/or outputted through an interface.

The step of using the values corresponding to the periods of the difference pulses to determine the desired parameter may comprise dividing a predetermined constant by an average of a certain number of the values to calculate the parameter. Relatedly, the method of the present invention may include the step of selecting the club type and selecting the predetermined constant from one of a plurality of predetermined constants based upon the club type selected. Alternatively, the step of using the values corresponding to the difference pulse periods to calculate the desired parameter may comprise the step of relating the average of a certain number of values to the desired parameter through an empirically derived database or function approximating an empirically derived database which is independent of the type of club used to strike the ball.

In one embodiment of the present invention, the method can include the additional step of determining whether the "lock" on the motion of the golf ball is preceded by data (i.e. values corresponding to periods of the difference pulses) which is indicative of the motion of a club head. If the data causing the "lock" is not preceded by a characteristic club head curve, the data is assumed to be invalid and is ignored since it is probably characteristic of the motion of an object other than a golf ball struck by the user of the device. In this way, the present invention is able to obviate one of the problems in prior art systems, i.e. it is able to discern between values characteristic of the motion of a golf ball struck by the user of the device and other moving objects which may reflect a portion of the transmitted radiation. Also, this embodiment permits the unit to be placed behind the golf ball thereby increasing the accuracy of parameter measurements.

In addition, this embodiment can include the steps of estimating the carry distance, the angle of trajectory, the approximate true speed of the struck golf ball, as well as club-head speed, swing tempo and whether the ball has been "mis-hit" by the golfer. Carry distance may be estimated by first averaging a certain number of values corresponding to the periods of difference pulses representative of the motion of the golf ball. The average value may then be used to determine the estimated carry distance via an empirically derived database or an empirically derived function. Also, club-head speed and swing tempo may be estimated and a "mis-hit" may be detected by comparison to empirically derived curves which are characteristic of the motion of a golf club and golf ball during a golf shot. The angle of trajectory and true speed of the golf ball may be mathematically determined directly from the values corresponding to the periods of difference pulses.

The apparatus of the present invention includes means for receiving radiation reflected off of a golf ball after it has been struck by a golf club, means for generating a sequence of difference pulses having a frequency substantially proportional to the velocity of the moving golf ball, means for determining the period of the difference pulses, and means for applying the period to a preselected constant to calculate the parameter. Preferably, the determining means and the applying means comprise a microprocessor programmed to carry out the instructions necessary to perform the calculations to determine the parameter.

The apparatus can also include means for entering a golf club type, means for storing a plurality of predetermined constants and means for selecting one of the predetermined constants based on the club type selected. A memory, such as a nonvolatile memory, can also be provided for storing the selected club type and the calculated parameter. The apparatus also can include means for activating the apparatus only upon impact of the golf club against the golf ball, such as with an acoustic trigger or an electric eye, thereby preventing the generating means from generating the sequence of difference pulses until the golf ball is struck. Means for interfacing the apparatus with an external computer and means for displaying the calculated parameter can also be included.

In another embodiment of the present invention, the apparatus includes means for determining whether the generated difference pulses correspond to the golf ball struck by the user of the apparatus. In this embodiment, calculations of the desired parameter are only triggered if it is determined that at least some of the generated difference pulses correspond to the motion of a club-head striking a golf ball. In addition, this embodiment can include means for calculating parameters regarding the motion of a golf ball (such as carry distance, angle of trajectory, ball speed, club-head speed, and swing tempo) without knowing the club type being used by the golfer.

BRIEF DESCRIPTION OF THE DRAWINGS

FIG. 1b is a top view of the apparatus illustrated in FIG. 1a;

FIG. 1c is a perspective view of the bottom of the apparatus illustrated in FIG. 1a;

FIG. 3a illustrates an exemplary waveform of a difference signal after reflection by a golf ball;

FIG. 3b illustrates difference pulses generated from the difference signal of FIG. 3a.

FIGS. 7a–d illustrate the operation of a memory queue included in one embodiment of the invention.

DETAILED DESCRIPTION

Figure 1A:
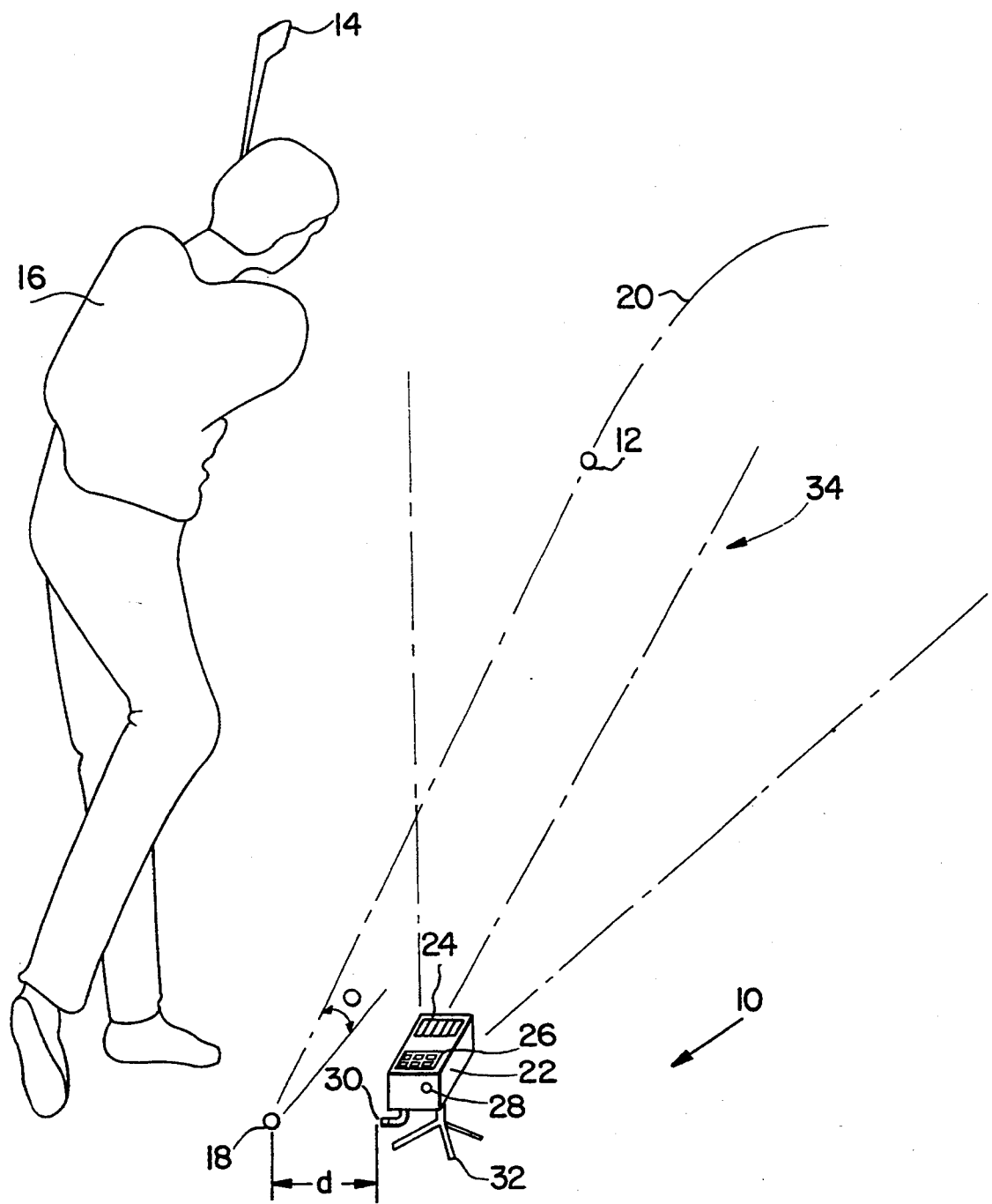
FIG. 1a illustrates one embodiment of the apparatus of the present invention positioned proximate to a golf tee and a golfer.

FIG. 1a illustrates an apparatus 10 of the present invention for estimating the carry distance of a golf ball 12 after it has been struck by a golf club 14 in the hands of a golfer 16. Both the apparatus 10 and the method of the present invention can be employed to determine other parameters of the motion of other objects but will be described herein with respect to a particular application, that of estimating the carry distance of a golf ball. The golf ball 12 in FIG. 1a is shown after being hit off of a starting point 18 (such as a tee) and is in flight on a trajectory having an initial launch angle Θ and represented by the dot-dashed line 20.

Figure 1C:
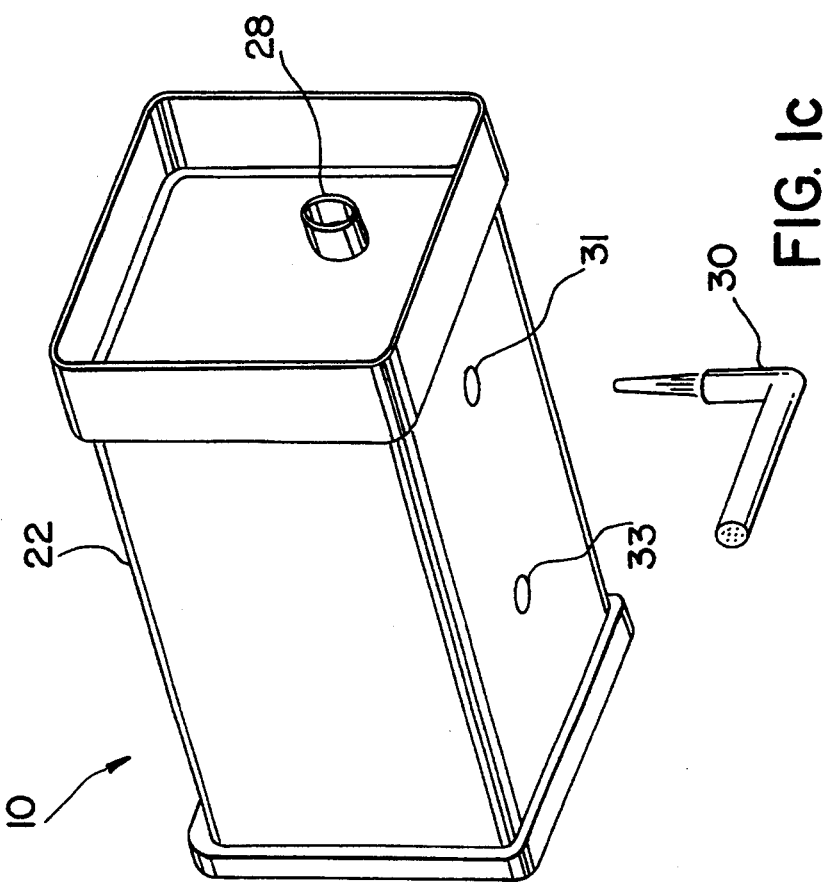
Figure 1B:
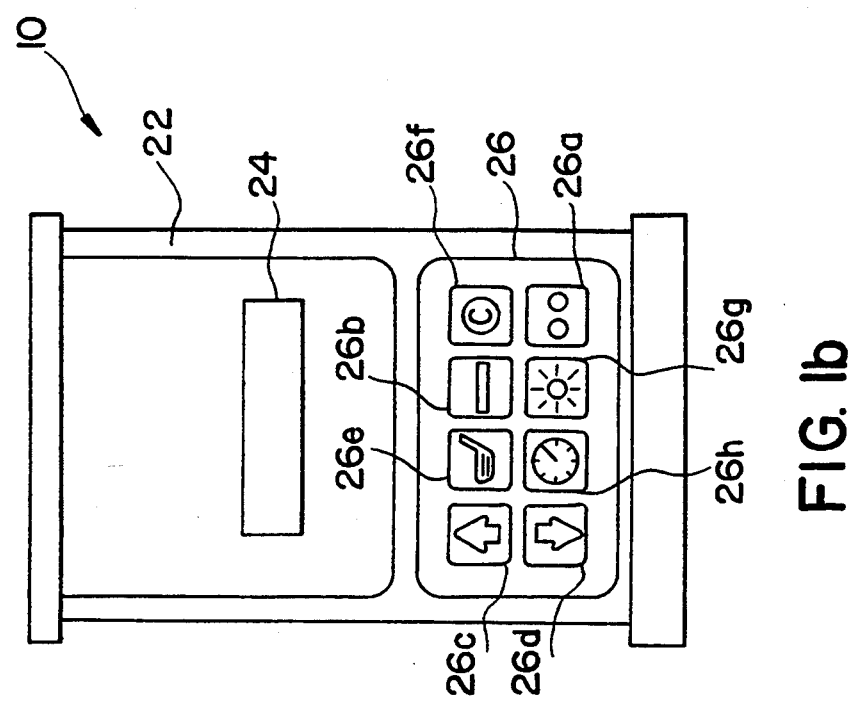

The apparatus 10 includes a housing 22 having an alphanumeric display 24 and a keypad 26, both preferably mounted on the top of the housing 22 (FIG. 1b) for convenient viewing and key manipulation by the golfer 16. Additionally, the apparatus 10 can include a jack 28, shown on the back of the housing 22, to facilitate interconnecting the apparatus 10 with an external power source, a battery charger, a remote display, and/or an external computer. The apparatus 10 can also include a microphone 30 which can plug into another jack 31 in the bottom of the housing 22 (FIG. 1c) and interconnect with trigger circuitry 64 within the apparatus 10. For satisfactory operation of the microphone 30 and trigger circuitry 64, the housing 22 is preferably mounted on a small tripod 32 positioned a distance d from the starting point 18. The tripod 32 can screw into a threaded opening 33 in the bottom of the housing 22 or can be permanently secured to the housing 22. As will be explained in more detail below, upon impact of the golf club 14 against the golf ball 12, the microphone 30 and trigger circuitry 64 activates the apparatus 10 which transmits microwave radiation, indicated generally as 34, in the direction of the ball's trajectory 20. Radiation is reflected off of the ball 12 back to the apparatus 10 where portions of the transmitted and received radiation are mixed to generate a difference signal having a frequency substantially proportional to the velocity of the ball 12. The difference signal is processed and a series of difference pulses are produced, having the same frequency as the difference signal, and the average period of the pulses is determined. The average period is applied to a predetermined constant and the result displayed on the display 24 as the estimated carry distance of the golf ball 12. The velocity of the golf ball 12, or other moving object, can be determined in a similar manner.

Figure 2:
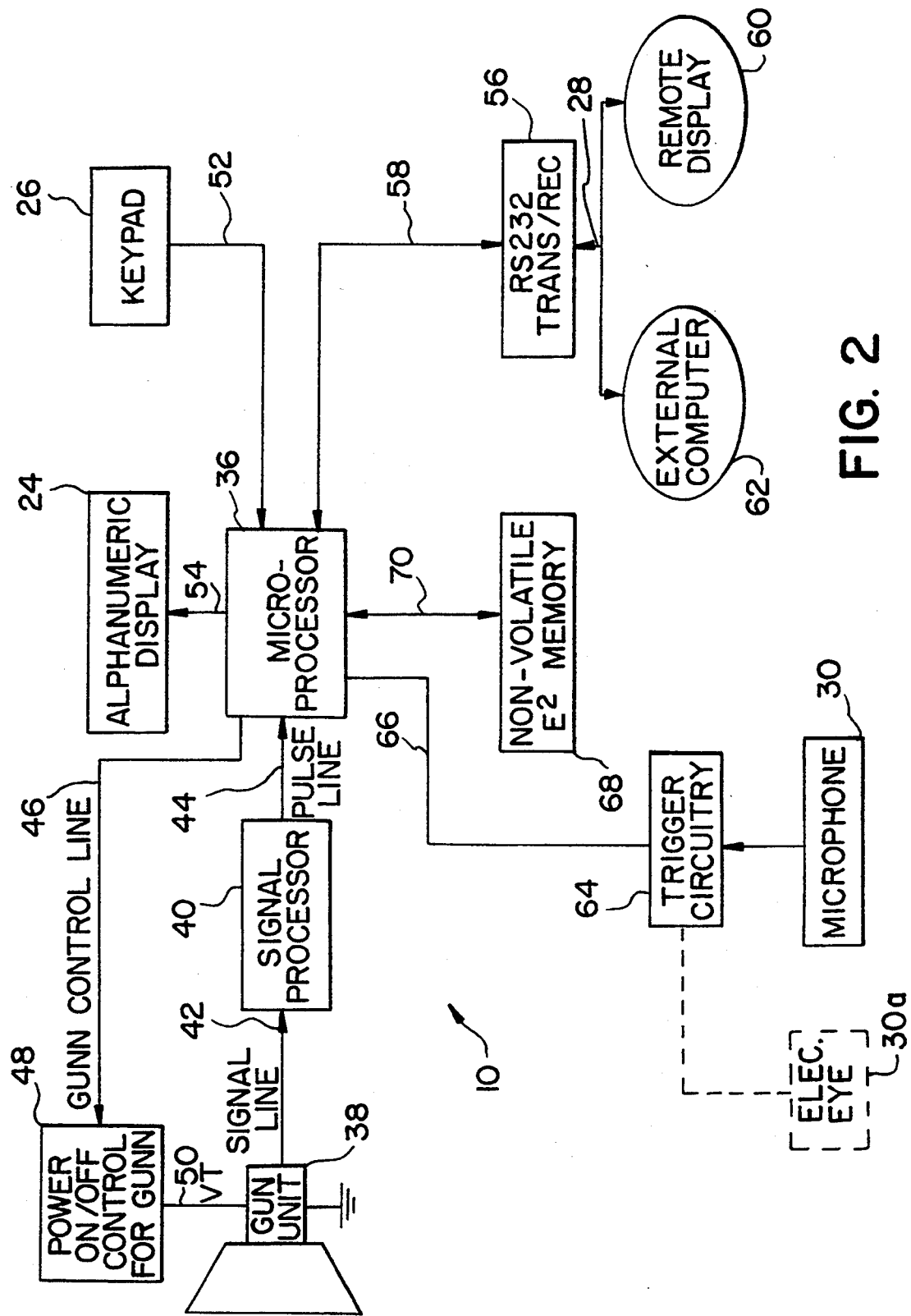
FIG. 2 is a block diagram of one embodiment of the apparatus of the present invention.

FIG. 2 is a block diagram of the apparatus 10. The apparatus 10 includes a microprocessor 36, having three parallel ports, internal RAM and ROM and an internal universal asynchronous receiver/transmitter (UART).

A Gunn diode/mixer assembly 38 for transmitting, receiving and mixing microwave energy is interconnected with the microprocessor 36 through a signal processor 40. A signal line 42 carries difference signals generated by the Gunn assembly 38 to the signal processor 40 and a pulse line 44 carries difference pulses generated by the signal processor 40 to the microprocessor 36. A Gunn control line 46 carries control signals from the microprocessor 36 to a power supply 48, interconnected with the Gunn assembly 38 by a voltage line 50, to activate and deactivate the Gunn assembly 38. The keypad 26, having an on/off key, is interconnected with the microprocessor 36 by a series of lines 52 and the display 24 is interconnected with the microprocessor 36 by another series of lines 54.

An interface, such as a serial (RS-232) interface 56, can be interconnected with the microprocessor 36 by lines 58 to couple the apparatus 10 with a remote display 60 or an external computer 62. These external devices 60 and 62 can plug into the interface 56 by means of the jack 28 on the housing 22.

The microphone 30, if used, plugs into the jack 31 on the housing 22 and connects with trigger circuitry 64. When the microphone 30 is plugged in and the apparatus 10 turned on, the Gunn assembly 38 remains deactivated until the microphone 30 detects an impact sound and causes the trigger circuitry 64 to send a signal on a control line 66 to the microprocessor 36 to activate the Gunn assembly 38. Alternatively, other means may be employed to activate trigger circuitry 64 (i.e. any means may be used which is able to detect when the golf ball is struck by the golf club). For example, an electric eye 30a may be used to detect the motion of the golf ball.

Additionally, a memory device, such as a nonvolatile memory 68, can be interconnected with the microprocessor 36 by a set of memory lines 70 for semi-permanent storage of calculated data.

For clarity, FIG. 2 does not show the power sources and voltage regulators which supply power to the various components of the apparatus 10. Preferably, a rechargeable battery (or set of batteries) is employed to power the apparatus 10. An external A.C. adapter can be plugged into the jack 28 to supply power and/or recharge the internal battery when the apparatus 10 is used indoors or near an A.C. outlet.

In operation, the golfer 16 positions the housing 22 proximate to the starting point of the golf ball 12. The Gunn assembly 38 is pointed in the direction of the expected trajectory 20 of the golf ball 12 and, if used, the microphone 30 is plugged into the bottom of the housing 22 and pointed at the starting point 18. Preferably, the housing 22 is positioned across the starting point 18 from the golfer 16 as illustrated in FIG. 1. The housing 22 can alternatively be positioned directly behind the starting point 18, although care must be taken to prevent it from being struck by the golf club 14 during the golfer's 16 swing or from receiving radiation reflected from the golf club 14 during the golfer's follow-through rather than from the golf ball 12 after it has been struck. Also preferably, the microphone 30 is highly directional and the trigger circuitry 64 adjusted so that it will only respond to impact sounds within a relatively short distance in the direction toward which the microphone 30 is pointed. A distance d of about 12 to 18 inches enables the trigger circuitry 64, when appropriately adjusted, to only respond to the sound of the impact of the club 14 against the ball 12 and not respond to impacts caused by nearby golfers (such as might occur at a driving range where several or many golfers are lined up practicing their golf shots).

The golfer 16 turns the apparatus 10 on and can enter the desired units of measurement (i.e., yards, feet, meters) by pressing the appropriate keys on the keypad 24. Similarly, golfer 16 can select the club type by pressing the appropriate keys on the keypad 24. The display 26, which can be an LCD display capable of displaying eight alphanumeric characters, displays the golfer's selections. For example, the keypad 24 illustrated in FIG. 1b includes eight keys 26a–26h. One key 26a is pressed by the golfer 16 to turn the apparatus 10 on and off. Another key 26b is pressed to indicate to the microprocessor 36 that a display units selection (such as yards, feet or meters) will be made; two keys 26c and 26d are pressed to scroll up and down through the available units displayed on the display 24. A key 26e is pressed-to indicate to the microprocessor that a club selection will be made. The up and down scroll keys 26c and 26d are then pressed to make the selection.

Other functions can also be accessed through the keypad 26 such as clearing an entry or the display 24 with a key 26f and adjusting the contrast of the display 24 with a key 26g. The amount of time the carry distance is displayed can be adjusted by pressing an eighth key 26h and then the up or down keys 26c and 26d. It can be appreciated that the microprocessor 36 can be programmed with other functions and that other combinations of key presses can activate less commonly used functions, such as might be desired for calibration purposes.

When the microphone 30 is plugged into the jack 31, the Gunn assembly 38 remains deactivated until the trigger circuitry 64 is activated. If the microphone 30 is not plugged in, the Gunn assembly 38 will transmit radiation when the apparatus 10 is turned on and attempt to receive reflected radiation and generate a difference signal on the signal line 42. It can be appreciated that the life of the internal battery will be increased if the microphone 30 is used.

When the golf ball 12 is struck by the golf club 14 at the starting point 18, the microphone 30 receives the impact sound and sends a signal to the trigger circuitry 64 which, in turn, transmits a trigger signal to the microprocessor 36 by way of the control line 66. The microprocessor 36 transmits a control signal by way of the control line 46 to the power supply 48 which, in turn, applies voltage to the Gunn assembly 38. The Gunn assembly 38 transmits microwave radiation and receives radiation reflected by the golf ball 12 in flight. The Gunn assembly 38 also mixes a portion of the transmitted radiation with the reflected radiation and generates a different signal on the signal line 42 which has a frequency substantially equal to the difference between the frequencies of the transmitted and received radiation. Because of the Doppler effect, the frequency of the difference signal is proportional to the velocity of the moving golf ball 12.

FIG. 3a illustrates the waveform of an exemplary difference signal generated by the Gunn assembly 38 and shows a number of strong peaks 72 of substantially uniform frequency, flat area 74 where the difference signal has "dropped out" and areas 80 and 84 during which the frequency of the difference signal is significantly greater or less than the frequency of the signal at 72. The signal processor 40 processes the difference signal and generates a corresponding series of square waves or difference pulses 76 (FIG. 3b) on the pulse line 44. During the period of time 74 in which the difference signal has dropped out, no difference pulses are generated, as shown by area 78 in FIG. 3b. The series of difference pulses is received by the microprocessor 36 which determines the period of each difference pulse and then calculates the average period of those which have substantially uniform or valid periods (i.e., pulses 76). The microprocessor 36 then recalls a predetermined constant from among a plurality of constants in its internal memory based upon the club type and units selected by the golfer 16 through the keypad 26.

It can be appreciated that golf balls having the same initial velocity but different launch angles Θ (FIG. 1), caused by impact with golf clubs having different head angles, will travel different distances. For example, a driver is typically used to obtain maximum distance and imparts a relatively low launch angle (relative to the horizon) to the golf ball. At the other extreme, a pitching wedge imparts a relatively high launch angle (about 57°) to the golf ball and causes the ball to travel a shorter distance over obstructions. Various woods and irons have head angles which vary between the two foregoing extremes and, therefore, cause the golf ball to travel correspondingly different distances if given the same initial velocity.

Thus, in one embodiment of the present invention, apparatus 10 employs the microprocessor 36 to store predetermined constants to provide accurate carry distance calculations for each club type and each set of units (i.e., yards, feet, meters) selected. To calibrate, the microprocessor 36 was programmed to display the period of the difference pulses when the golf ball 12 was struck with each different club. The average period for each club was then multiplied by the actual distance the ball traveled when struck by each different club to obtain the predetermined constant for each club. Predetermined constants for each set of units were calculated by multiplying the original constant for each club type by an appropriate conversion factor. All of the predetermined constants were programmed into the ROM portion of the microprocessor 36 and the apparatus 10 tested. Minor adjustments were made, as necessary, to the constants in order to match the displayed distance to the actual distance as closely as possible.

In actual operation, after the microprocessor 36 applies the appropriate constant to the average period of the valid difference pulses 76, the resulting estimated carry distance can be displayed on the display 24. In addition to, or in lieu of, displaying the carry distance on display 24, the carry distance can be transmitted to the remote display 60 or to an external computer 62 through the serial interface 56. If the apparatus 10 includes the nonvolatile memory 68, each calculated carry distance and its associated club selection can be stored in the nonvolatile memory 68 which will retain the information even when power has been removed from the apparatus 10. Depending upon the particular memory chip employed, 500 or more distances and club selections can be stored. At a later time, the external computer 62 can be interconnected with the microprocessor 36 through the serial interface 56 and the microprocessor 36 directed to download the information from the memory 68 into the external computer 62. There, it can be printed out, displayed and/or stored on a hard or floppy disk. Thus, each golfer using the apparatus 10 can keep a record of his or her golfing activity.

Figure 4A:
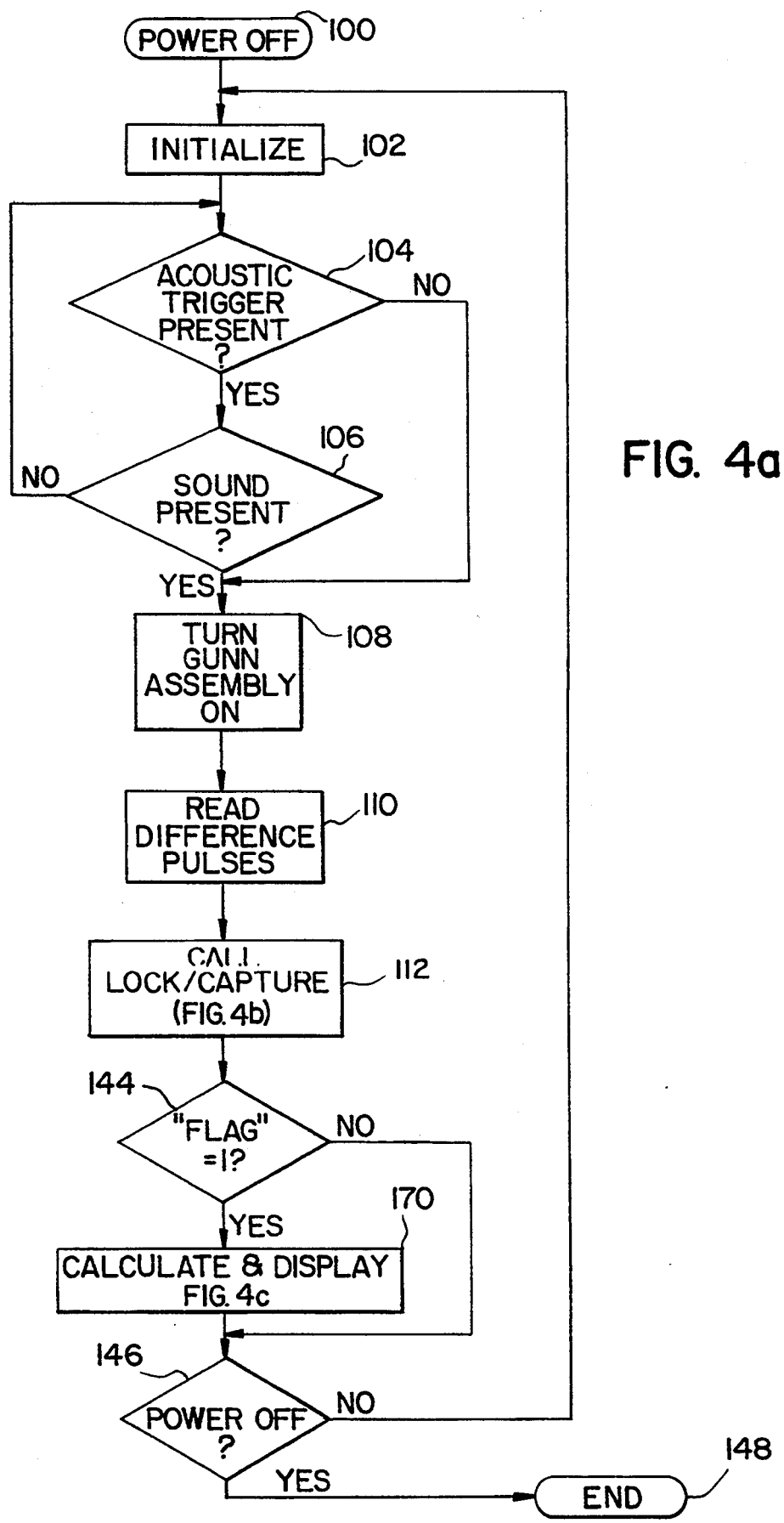
FIGS. 4a–4c are flow charts of one embodiment of the method of the present invention.
Figure 4B:
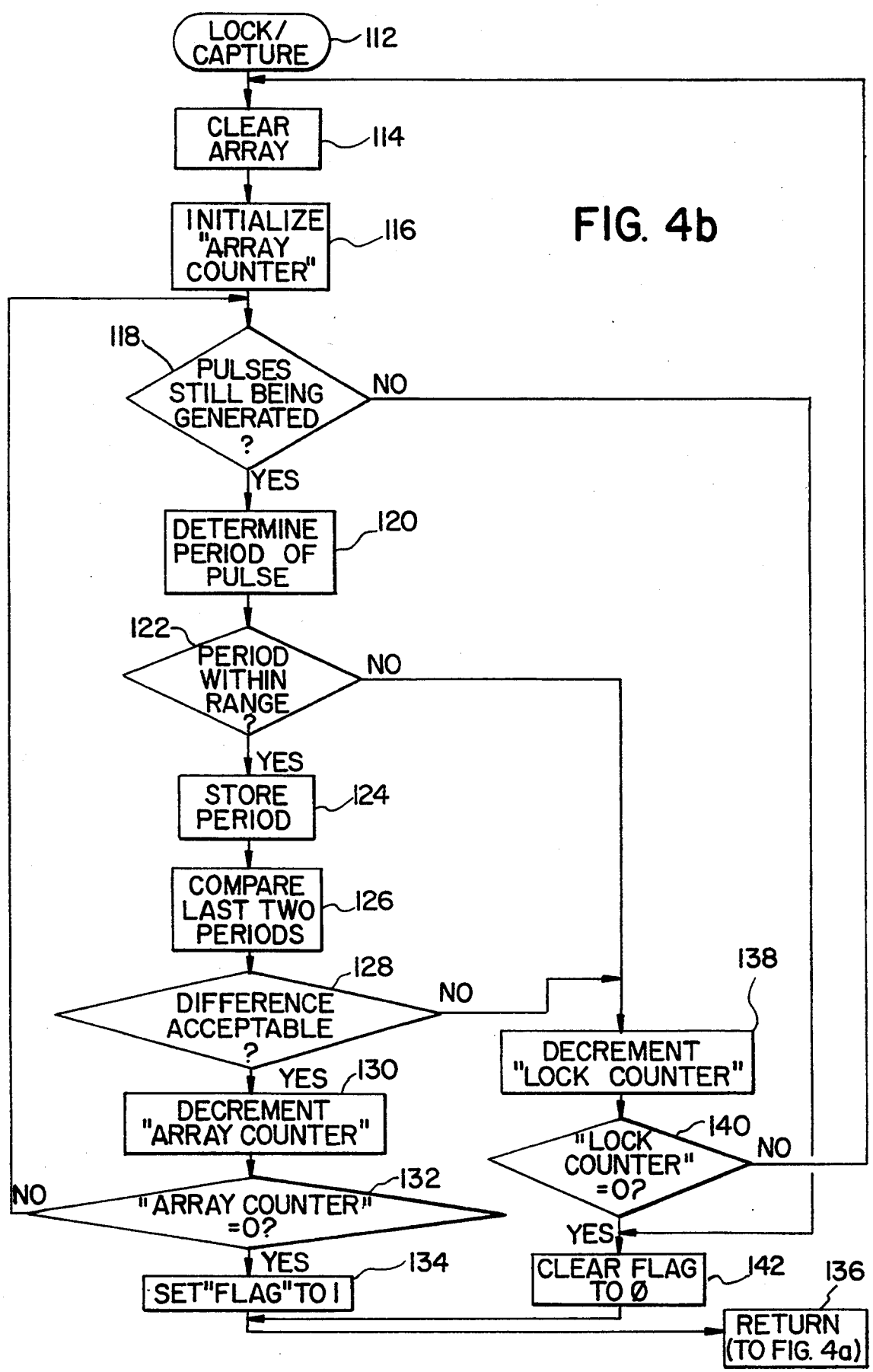

The process for estimating the carry distance of the golf ball 12 will now be discussed with reference to the flow charts of FIGS. 4a–4c; In order to simplify the illustration of the process, certain "housekeeping" tasks of the microprocessor 36 have not been shown at various points in the flow charts. These include, for example, periodically checking the keypad 26 for a key press (and the corresponding processing of such a key press), checking the condition of the internal battery, and checking the status of the serial interface 56 for any instructions transmitted by the external computer 64, if any. When the golfer 16 presses the on/off key on the keypad 26 (step 100, FIG. 4a), the microprocessor 36 begins executing instructions. Program variables, including a variable "LockCounter" as discussed below with respect to FIG. 4b, are initialized 102 and the microprocessor 36 determines 104 whether the microphone 30 is present. If so, the microprocessor 36 determines 106 whether an impact sound has been detected. If the microphone 30 is present but an impact sound has not been detected, the Gunn assembly 38 is not turned on and the microprocessor 36 checks again to determine whether the microphone 30 is still present 104 and, if so, whether an impact sound has been detected 106. When sound is detected, or if the microphone 30 is not present, the Gunn assembly is turned on 108. Upon activation, the Gunn assembly 38 transmits microwave radiation, receives radiation reflected off of any object in its path (such as the golf ball 12), mixes a portion of the transmitted radiation with the received radiation, and generates a difference signal. The signal processor 40 then generates 110 a series of difference pulses which are sent to the microprocessor 36.

After the Gunn assembly 38 has been activated 108 and difference pulses are being generated and read 110, the microprocessor 36 executes a routine Lock/Capture 112 to determine whether a lock has been achieved on the moving ball 12 and, if so, to calculate the estimated carry distance.

Referring to FIG. 4b, an array, or series of memory locations in the microprocessor 36, is cleared 114 and a variable "Array Counter" is set 116 to the number of locations in the array. This is the number of consecutive "valid" periods (as defined below) which must be received and processed for an estimated carry distance of satisfactory accuracy to be calculated. Then, it is determined 118 whether the difference pulses are still being generated. If so, the period of one of the difference pulses (the "current" pulse) is measured 120 by determining the difference in the status of an internal clock at the beginning of the current difference pulse (i.e., the rising edge 77, FIG. 3b) and the status of the internal clock at the beginning of the next difference pulse (i.e., the rising edge 79). Next, the microprocessor 36 determines 122 whether the measured period is reasonable by determining whether it is within a range of predetermined periods. For example, the period of the current pulse can be compared with values representing velocities of about 15 miles per hour and about 210 miles per hour since the velocity of a golf ball will typically be within this range. Values outside of this range are assumed to be meaningless and will be ignored.

If the "Current Period" is within the specified range, the "Current Period" is stored 124 in the array and then subtracted 126 from the last period stored in the array. (In reality, a value representative of the "Current Period" may be stored in the array). The deviation is compared 128 to a previously established number representing the allowable tolerance between the periods of difference pulses. If the deviation between the two periods is within the desired tolerance, the "Current Period" is deemed to be valid and "Array Counter" is decremented 130. The "Array Counter" is next examined 132; if it does not yet equal zero (indicating that the array is not full), the program loops back to step 118 and the foregoing process repeats until the "Array Counter" equals zero (the array is full) or the loop is otherwise exited. When the "Array Counter" equals zero, a "Flag" is set 134 to 1 and execution returns 136 to FIG. 4a where another routine is called to calculate and display the carry distance.

If the "Current Period" is not within the desired range 122 or if the deviation between two consecutive periods is not acceptable 128, "LockCounter" is decremented 138 and then examined 140. If "LockCounter" does not equal zero, the program loops back to step 114 and the process repeats. If "LockCounter" equals zero at step 140, or if pulses are no longer being generated at step 118, the "Flag" is cleared 142 to 0 and execution returns 136 to FIG. 4a.

For example, if "Array Counter" is initialized in step 116 to 32 and "LockCounter" initialized in step 102 to 4, then 32 consecutive periods must be valid, and their values captured and stored in the array, in order for a lock on the ball-to have been achieved and the values processed. If any period is not valid because it is outside of the acceptable range (step 122) or because the deviation between two consecutive pulses is too great (step 128), up to three additional attempts are made to fill the array with thirty-two valid periods. If these attempts also fail, the "Flag" is cleared 142 to 0 and execution returns 136 to FIG. 4a. Additionally, in one embodiment of the present invention, the trigger circuitry 64 (FIG. 2) includes a monostable multivibrator, or "one-shot" having an on-time of, for example, about 400 milliseconds. If the circuitry 64 shuts off the Gunn assembly 38 at any time during the routine illustrated in FIG. 4b, such a change in state will be detected at step 118, the "Flag" will be cleared 142 to 0 and execution return 136 to FIG. 4a. It will be appreciated that trigger circuitry 64 can be used to deactivate only microprocessor 36 after a predetermined "on-time," allowing Gunn assembly 38 and signal processor 40 to continue to operate. In either case, by discontinuing the processing of data after a preset period of time (such as 400 milliseconds) the possibility of inaccurate readings due to moving objects within the range of apparatus 10 other than the desired golf ball is reduced.

As noted, an "electric eye" 30a could be used in place of microphone 30 to trigger the activation of Gunn assembly 38, signal processor 40, and/or microprocessor 36 when the user of apparatus 10 strikes golf ball 12. The electric eye preferably comprises a light source (such as a laser or lasers) and a receiver. The electric eye is positioned so that when golf ball 12 is struck, it passes between the light source and the receiver, thereby blocking the reception of the light by the receiver. Apparatus 10 is subsequently activated via trigger circuitry 64.

Referring again to FIG. 4a, the "Flag" is examined 144 and, if it has not yet reached zero, it indicates that a lock has not yet been achieved; it is then determined 146 whether the power on/off key has been pressed. If so, execution ends 148; if not, the program loops back to step 102 and the foregoing process repeats.

If, on the other hand, the "Flag" was set to 1, as determined in step 144, then the predetermined number of consecutive, valid periods have been received and captured in the array and the microprocessor 36 executes a routine 170 to actually calculate and display the carry distance of the golf ball 12.

Figure 4C:
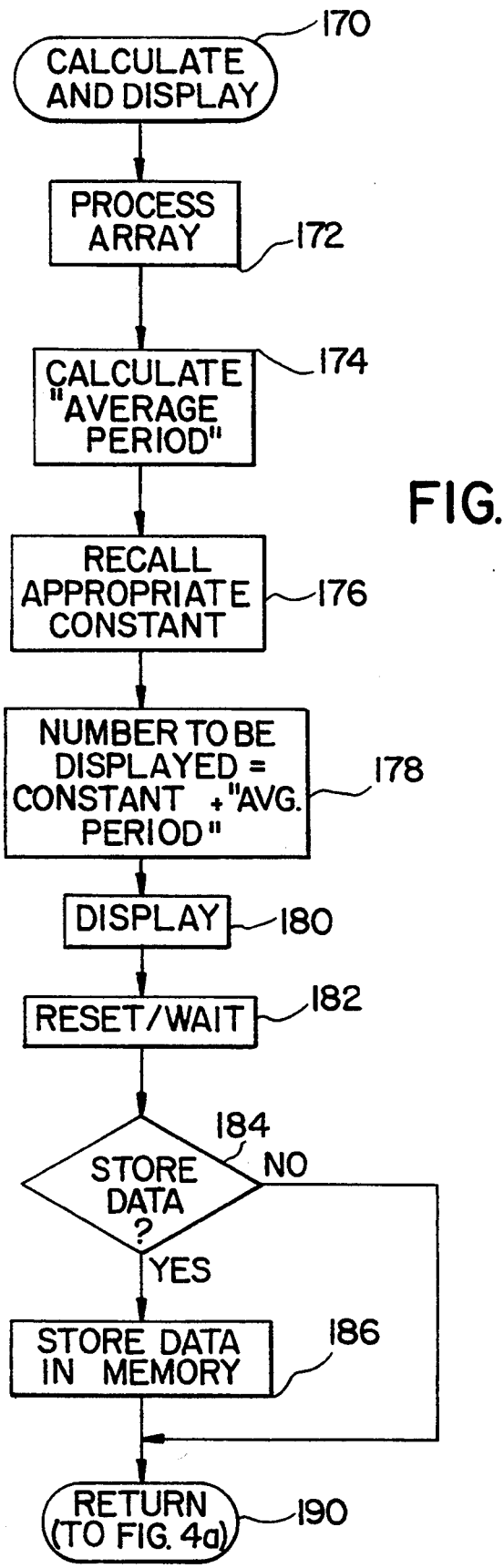

Referring now to FIG. 4c, the values in the array are processed 172 and selected values are averaged 174 to generate the "Avg Period", thus improving accuracy and repeatability. The appropriate constant is then recalled 176, based upon the selected club type and desired units as previously detailed, and the carry distance calculated 178 by dividing the constant by the "Avg Period". This number is then displayed 180 on the display 24 of the housing 22 and, if desired, sent to the remote display 60 or to the external computer 62. The number can be displayed for a predetermined amount of time 182 after which the display 24 displays the current club setting. While the carry distance is being displayed, the Gunn assembly 38 is off to conserve power.

Additionally, the microprocessor 36 determines 184 whether the carry distance and club selection are to be stored in the memory 68. If so, a routine 186 is called to do so; otherwise, or after the data has been stored, execution of the program returns 190 to the main program (FIG. 4a). If the power on/off key on the keypad 24 has been pressed 146 to turn off the apparatus 10, then the program ends 148. Otherwise, the program loops back to step 102 and the apparatus 10 waits for another golf ball 12 to be hit.

Importantly, the present invention is not limited in the speed at which it may begin calculating the estimated carry distance of the golf ball by a fixed timing window. In the example described above, if the first thirty-two difference pulses generated are valid and result in a lock and capture, then the estimated carry distance can be calculated after only thirty-two periods have been generated. For a ball traveling about 200 miles per hour, the Doppler frequency is approximately 6260 Hz and the period of the difference pulses is about 160 microseconds. Consequently, the microprocessor 36 would begin calculating the estimated carry distance after approximately 5.1 milliseconds (160 microseconds per period times 32 periods). By contrast, a Doppler device which counts the number of difference signals within a fixed window cannot begin calculating the estimated carry distance until the end of that window. Thus, regardless of the velocity of the golf ball, such a device would require about 31.9 milliseconds after a lock has been achieved before the carry distance could be determined. During such a length of time, the Doppler device could lose its lock on the golf ball and/or noise, interference or drop-outs could affect the accuracy of the device. It can be appreciated that an increase in the window width (i.e., an increase in the length of time required for counting) may be required with such devices if other units or other club settings are desired.

The effects of such disadvantages in prior devices are reduced in the apparatus and method of the present invention by determining values corresponding with the periods of the difference pulses rather than counting the number of difference pulses and then using the values to calculate a desired parameter regarding the motion of the golf ball. The total amount of time required can be reduced further if the number of valid difference pulse periods required for obtaining a lock and for averaging the period are reduced. Therefore, the present invention is not limited to employing any particular number of periods for obtaining a lock and for averaging; the numbers thirty-two and four are disclosed herein for exemplary purposes only.

In an another embodiment of the present invention, apparatus 10 is provided to calculate the projected carry distance of a golf ball without requiring the user to input the club type used to strike the ball. In this embodiment projected carry distance is calculated directly from values representative of the periods of difference pulses produced by signal processor 40. Microprocessor 36 is provided with an empirically derived database which relates a value corresponding to the average period of difference pulses produced by signal processor 40 to a number which, when divided by the value (e.g. the average period) produces a projected carry distance. Alternatively, the empirically derived database may be closely approximated with a function programmed into the ROM of microprocessor 36, thereby reducing the amount of memory required. This embodiment may also be used to calculate the angle of trajectory of the golf ball with respect to level ground as well as the speed of the golf ball.

Figure 5:
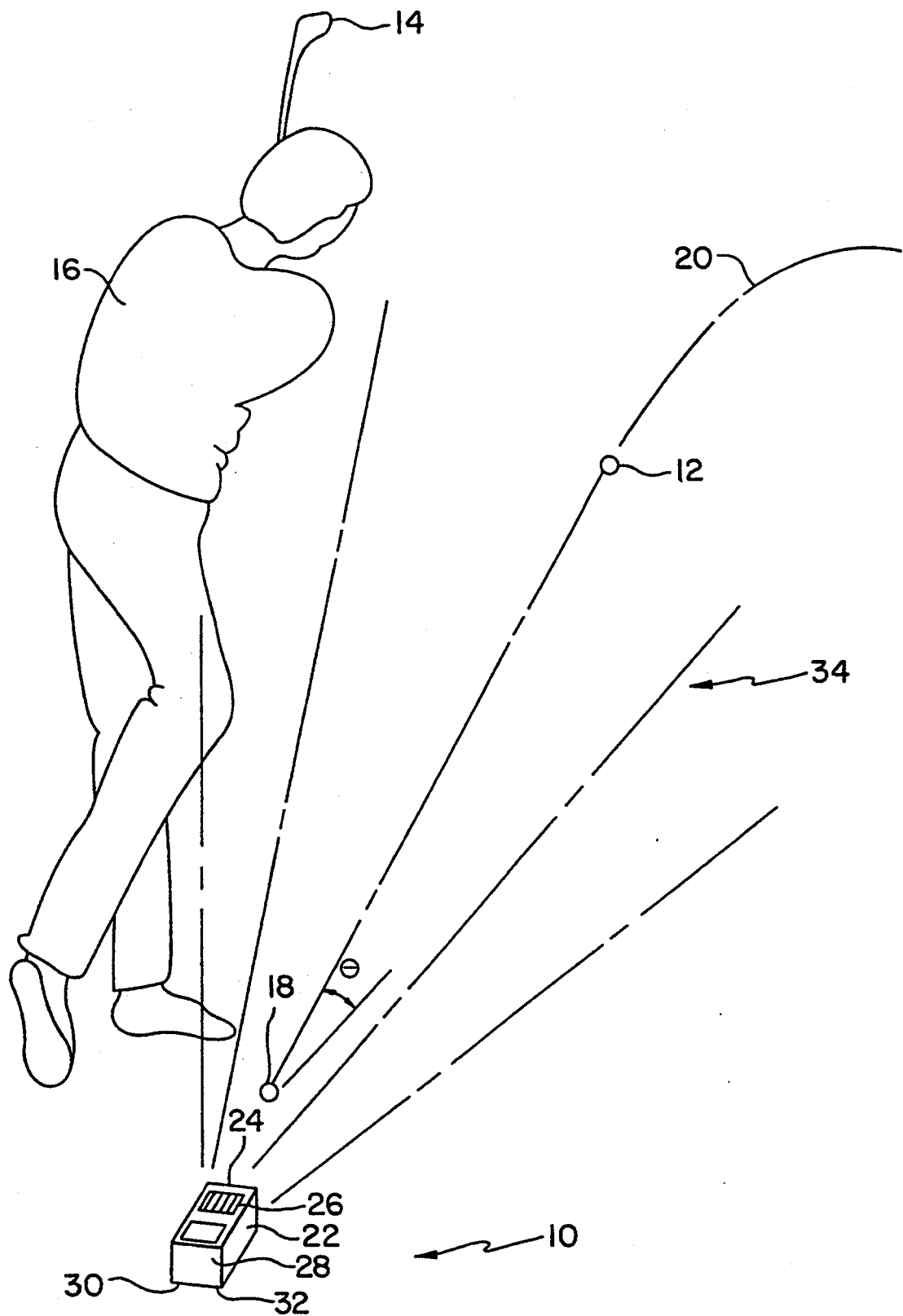
FIG. 5 illustrates another embodiment of the present invention wherein the unit is placed behind the tee relative to the direction of the golf shot.
Figure 6A:
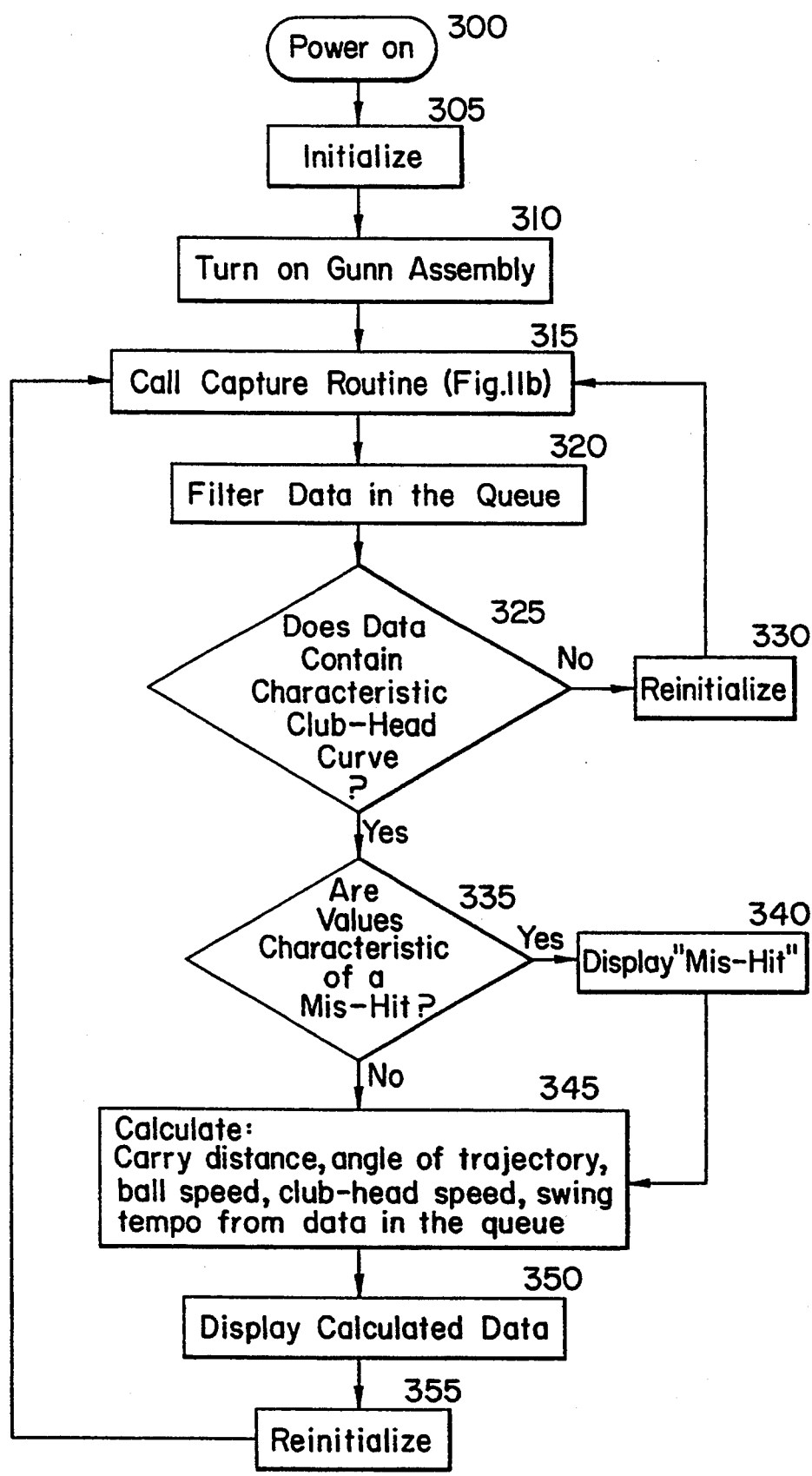
FIGS. 6a–b are flow charts describing the operation of one embodiment of the invention.
Figure 6B:
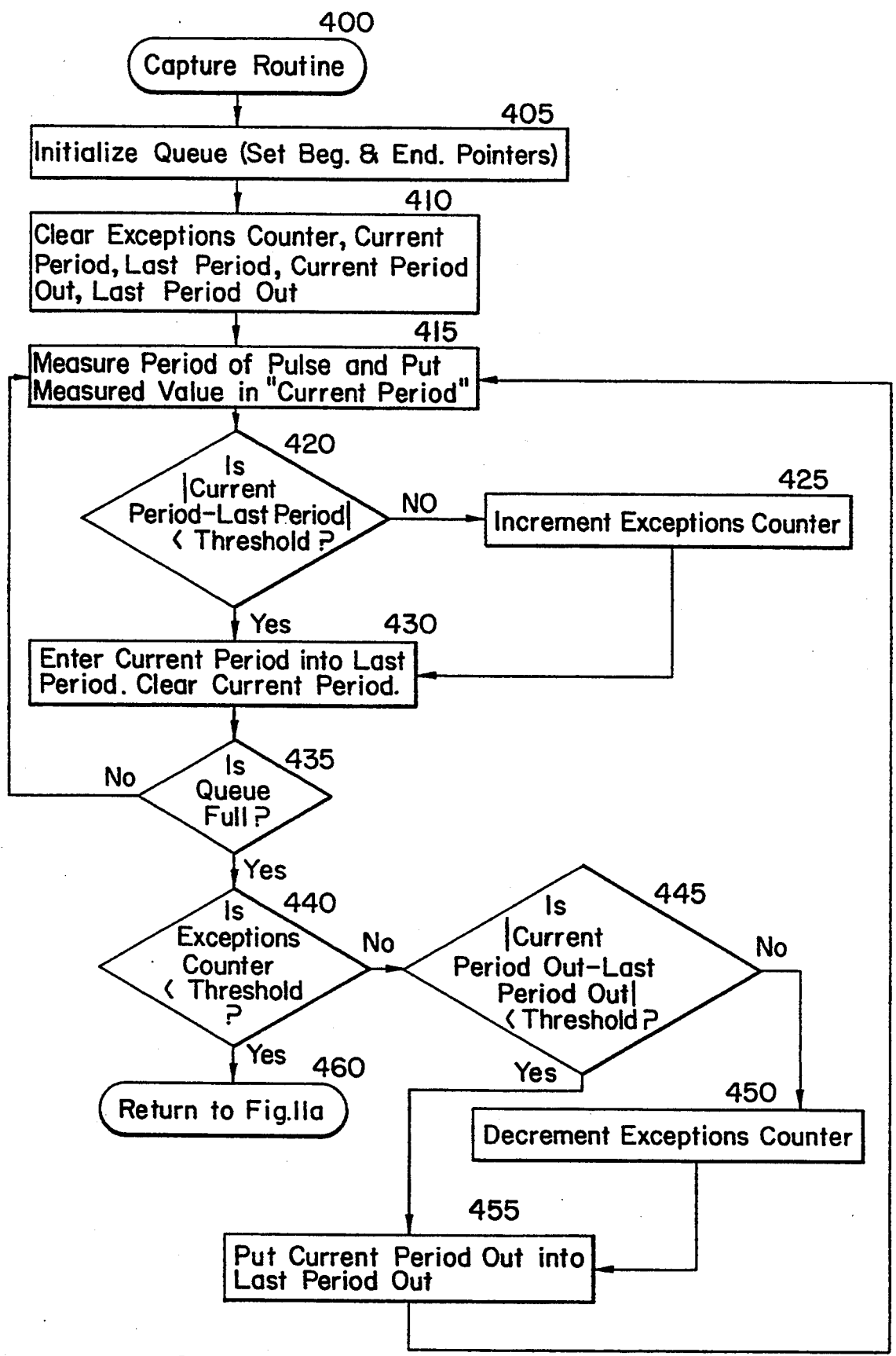

In this embodiment apparatus 10 is disposed behind starting position 18, as shown in FIG. 5, and angled such that the cone of radiation transmitted by Gunn unit 38 intersects a portion of the swing path of golf club 14. Gunn unit 38 preferably transmits a divergent cone of radiation which, when apparatus 10 is placed approximately three feet behind starting point 18, creates a square of radiation two feet in front of starting point 18 approximately 2.5 ft. ×2.5 ft. in dimension. Thus, when the ball is struck, Gunn unit 38 receives radiation reflected off of both the golf ball 12 and the club-head of golf club 14. This embodiment of the present invention presents a way to use the radiation reflected off of the club-head of golf club 14 provide enhanced accuracy in the calculation of parameters regarding the motion of golf ball 12, and to discriminate between golf ball 12 and other moving objects within the range of apparatus 10.

When the club-head of golf club 14 moves through the "hitting area" (the portion of the swing path comprising the area directly behind and in front of starting position 18) it reflects radiation back to Gunn unit 38 at a frequency characteristic of its motion. In fact, after the ball 12 is struck by the club-head, the frequency of the reflected radiation will be characteristic of the motion of both the club-head and the ball until the golfer follows through enough to move the club-head out of the cone of radiation transmitted by Gunn unit 38. These characteristics are evident in the pattern of durational periods of the difference signals produced by signal processor 40 when golf ball 12 is struck by golf club 14.

In this embodiment the pattern of durational periods characteristic of the motion of a club-head and golf ball through the hitting area is functionalized and programmed into the ROM of microprocessor 36. Microprocessor 36 is then programmed to look for and recognize this pattern whenever it is processing data relating to a moving object within the range of apparatus 10. Microprocessor 36 is provided with a memory queue 250 to store values representative of the periods of difference pulses produced by signal processor 40. Queue 250 is large enough to store values for pulses representative of the motion of a club-head and ball 12 through the hitting area as well as the motion of ball 12 alone once the club-head is moved outside of the cone of radiation. (In reality, the club-head does not necessarily have to leave the cone of radiation. Once the ball is struck, difference pulses due to radiation reflected off of the ball will be much stronger and more consistent than those created by the club-head which are essentially ignored.) When microprocessor 36 processes the data in queue 250, it first compares the pattern of values in queue 250 to the characteristic, predetermined function for club-head and ball motion to ensure that the data is representative of a shot hit by golfer 16. If the pattern of data in queue 250 substantially corresponds to the programmed function, microprocessor 36 will proceed to calculate the projected carry distance of golf ball 12 from an empirical data base. However, if the pattern of data in queue 250 does not substantially correspond to the programmed function, projected carry distance is not calculated, and the data is ignored. In this way, recognition of the portion of data points corresponding to the motion of golf club 14 as it strikes golf ball 12 acts as a trigger for microprocessor 36 to calculate the projected carry distance of golf ball 12.

Data in queue 250 is processed by microprocessor 36 whenever queue 250 is full and contains a predetermined number of valid entries. Therefore, processing can be initiated by any moving object which remains within the range of apparatus 10 for long enough to fill queue 250 with a sufficient number of valid entries. For example, a shot hit by an adjacent golfer at a driving range which crosses into the range of apparatus 10 could cause the data in queue 250 to be processed. However, since microprocessor 36 has been programmed to look first for a pattern of data points characteristic of a club-head striking a golf ball, carry distance for the shot of the adjacent golfer would not be calculated or displayed.

FIGS. 6a–b and 7a–d illustrate the operation of this embodiment of the invention. When power is supplied to the apparatus 300, microprocessor 36 and its queue 250 are initialized 305 and the Gunn assembly 38 is turned on 310. Gunn unit 38 begins transmitting radiation into the expected path of the golf ball. Any radiation reflected back to the Gunn unit 38 is received and fed into signal processor 40 which produces difference pulses as described previously. The difference pulses are transmitted to microprocessor 36. As discussed, microprocessor 36 includes a queue 250 for temporarily storing values representative of the periods of the difference pulses produced by signal processor 40.

When the apparatus 10 is turned on, the queue 250 is initialized 405 by setting two pointers, Begin and End (B and E), to positions directly in front of the first memory cell which is part of the queue (cell 1). The value in cell 0 is referred to as the "current period." The current period comprises the next value representative of a difference pulse period waiting to enter the queue. The "last period" is the value which has most recently entered the queue and is stored in cell 1. The "current period out" refers to the value which is about to be pushed out the end of the queue (here, cell 200), and "last period out" is the value which has most recently been removed from the queue (here, cell 201). All of these values are cleared 410 before the queue begins to accept data. In addition, an exceptions counter, the operation of which will be described hereinafter, is initialized and set to equal zero.

Once signal processor 40 begins to produce difference pulses, microprocessor 36 produces 415 a value representative of the period of the pulse on its input and places the value into the "current period" position of queue 250. Microprocessor 36 then determines 420 if the difference between the current period and the last period is less than a predetermined threshold value. If the difference is more than the threshold value, the exceptions counter is incremented 425 before the current period is placed 430 into the position of the last period (which moves each of the values already in the queue 250 up one memory cell). The current period position is then cleared. Microprocessor 36 then determines 435 whether the queue 250 is full. This is done by checking if pointer E is set beyond the current period out (here, cell 200). Pointer E moves up one memory cell each time a value is entered into the queue.

If the queue 250 is not full, the period of the next pulse on the input of microprocessor 36 is measured, and steps 415 through 435 are repeated until queue 250 is full. Once queue 250 is full, microprocessor 36 checks 440 is see if exceptions counter 440 is below a predetermined threshold. If not, microprocessor 36 calculates 445 the difference between the current period out and the last period out. If the difference is larger than a predetermined threshold (the same threshold used at step 420) the exceptions counter is decremented because this means that an exception is leaving the queue. The current period out is then placed into the position of the last period out 455 and steps 415 through 455 are repeated until the exceptions counter reaches a level below the predetermined threshold. Thus, queue 250 continues to accept difference pulse period data until it is full and contains less than a predetermined number of exceptions or errors. When this is achieved, the queue is assumed to contain values which relate to a moving object within the range of apparatus 10, and the data is ready for processing.

Data in the queue 250, in this case data in cells 1–200, is then "captured" 315 and filtered 320 to smooth out exceptions which might significantly affect results. In order to discern between the golf ball struck by the user of the apparatus 10 and other moving objects within its range (e.g. a ball struck by an adjacent golfer), microprocessor 36 looks for data in the queue indicative of a club-head striking the ball as previously discussed. If the data in the queue 250 does not contain values characteristic of a club-head moving through the hitting area, the data in the queue is assumed to be representative of some other moving object in the range of apparatus 10 and is ignored. Apparatus 10 is reinitialized 330, pointers B and E are reset to precede cell 1, and queue 250 attempts to fill up and lock on another moving object.

If the data in queue 250 does contain values characteristic of a moving club-head, the data is checked 335 to see if the ball was mis-hit by the golfer. As will be discussed, a mis-hit golf ball will have an unusual spin on it which will result in known peculiarities in the values of queue 250. If microprocessor 36 determines that the ball has, in fact, been mis-hit it will display "Mis-hit ball" on display 28. This alerts the golfer that the computed parameters may be inaccurate. A ball which has been mis-hit usually will not stay in the air for as long as a correctly struck ball.

The projected carry distance of golf ball 12 is calculated 345 without first necessitating the user to input which club is being used. Instead, the periods of the difference pulses have been directly correlated to carry distances through empirical testing. The periods of the difference pulses generated by signal processor 40 are indicative of the relative velocity of the ball along the axis defined by the ball and apparatus 10. A relative velocity measurement includes the proportional effect of trajectory. For example, if two balls have the same speed and different trajectories, their relative velocities as observed from the same position will be different. Therefore, the present invention is able to relate the periods of the difference pulses, which are indicative of relative velocities, directly to carry distance through empirical data. Also, since the apparatus 10 can discern between the club-head and the ball, thereby allowing it to be placed behind starting point 18, apparatus 10 is able to transmit radiation substantially in the same direction as the ball is travelling. This reduces the variations in projected carry distance between two balls with the same relative velocity. In addition, from its position from behind starting point 18, apparatus 10 is able to transmit a diverging cone of radiation which can reflect even off of golf balls hit with a tremendous amount of loft.

Figure 11:
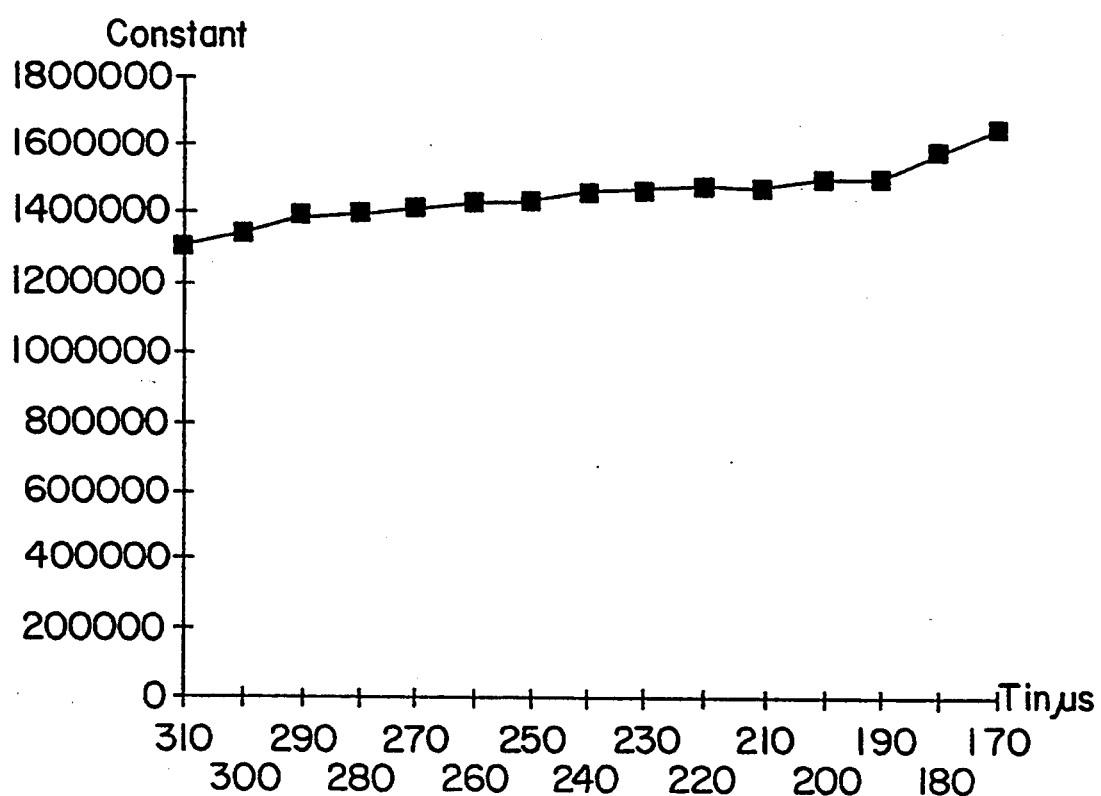
FIG. 11 illustrates an exemplary graph of the relationship between difference pulse periods related to radiation reflected off a correctly struck golf ball and empirically derived values used to calculate projected carry distance.

In order to calculate a predicted carry distance in this embodiment, the periods of a certain number of the most recent entries in the queue 250 (for example cells 1–80) are averaged, and the average period is divided into a predetermined value. The predetermined value is taken from a function derived from an empirically derived characteristic curve (which is shown in FIG. 11 and will be discussed later) and is independent of the club used by the golfer.

In addition, the present invention may be used to calculate 345 the angle of trajectory of the ball as compared to level ground and the actual speed of the ball. The angle trajectory can be empirically related to the rate of change in the periods of the difference pulses which represent relative velocities. The ball speed can then be mathematically approximated from the average relative velocity and the angle of trajectory. In one embodiment, the present invention may use the angle of trajectory to further enhance the prediction of carry distance. In effect, after the carry distance has been calculated from the average period of the difference pulses, the angle of trajectory may be used to see if the carry distance "makes sense." For example, if the carry distance is calculated to be 150 yds., one would expect the angle of trajectory to be about 42 degrees for a normal shot. If the angle of trajectory is calculated to be only 15 degrees, the shot was probably only hit with a half swing or hit by a weaker player and the carry distance measurement can be decreased to compensate. In order to use the calculated angle of trajectory to refine the projected carry distance, another empirical database can be developed and stored in the ROM of microprocessor 36. This database would include empirically derived data relating angle of trajectory to carry distance for a properly struck golf ball. Microprocessor 36 would then also be supplied with an algorithm to compare the calculated angle of trajectory for the projected carry distance with the expected angle of trajectory for that carry distance from the empirical database. The algorithm would also include equations for the refinement of the projected carry distance based on the difference between the calculated and expected angles of trajectory. Specific methods for the calculation of the angle of the trajectory, ball speed, club-head speed and swing-tempo will be discussed with reference to FIGS. 8–10.

After the completion of calculations, the projected carry distance and, if desired, the angle of trajectory, ball speed, club-head speed, and swing tempo are then displayed 350 on display 28 or remote display 60 and the apparatus is reinitialized 355.

FIGS. 7a–d are detailed illustrations of the queue 250 at different stages in the above-described process. FIG. 7a shows queue 250 after it has been cleared and data has begun to be fed in. Notice that pointer E follows the leading edge of the incoming data (shaded) until the queue 250 is full. In FIG. 7b queue 250 has been filled, however the exceptions counter is set above its threshold and therefore no lock has occurred. In FIG. 7c a lock has been achieved on a moving object and the microprocessor 36 begins processing the data contained in cells 1–200. Note that cell 0 is unoccupied as microprocessor 36 ignores any difference pulses it receives from signal processor 40 until it is finished processing the data in queue 250. In FIG. 7d the processing of data in the queue 250 has been completed and new data is allowed to enter. Note that pointer E is reset to precede cell 1 and will follow the leading edge of the new incoming data. Therefore, though memory cells 1–200 are filled with data, the queue is effectively empty until the new data pushes the old data out.

Figure 8:
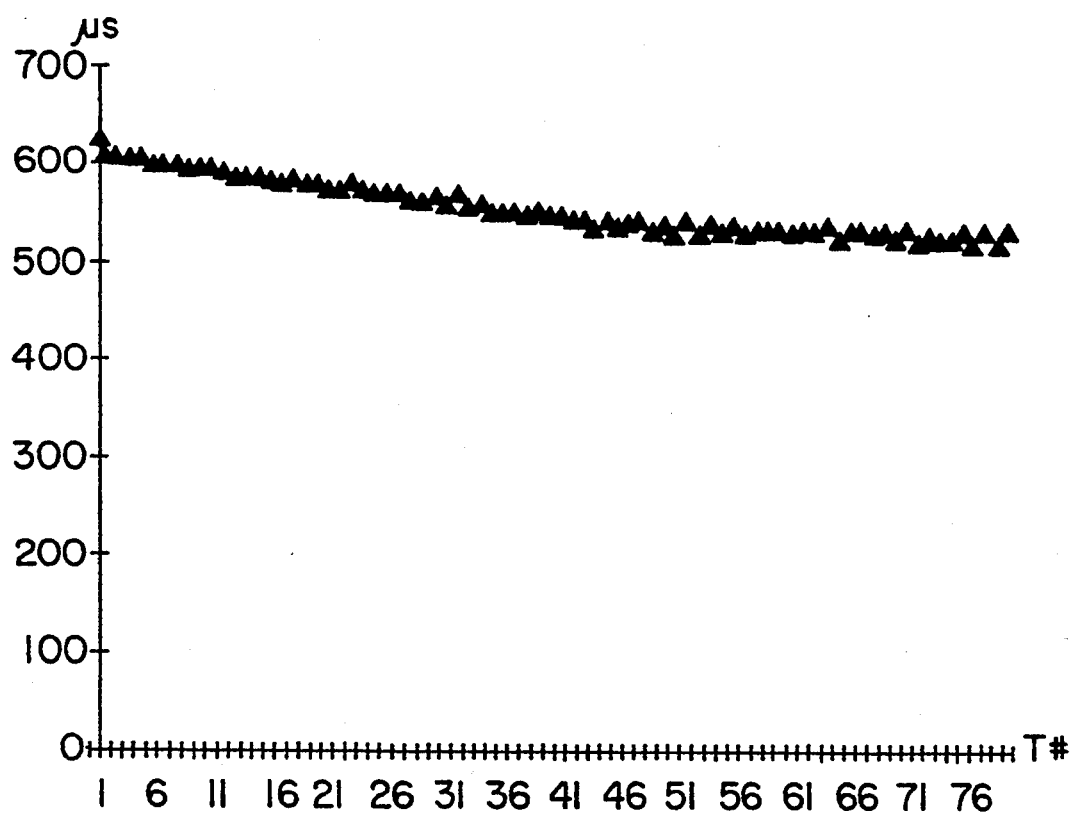
FIG. 8 illustrates an exemplary graph of difference pulse periods related to radiation reflected off of a moving object not struck by the user of the apparatus.
Figure 9:
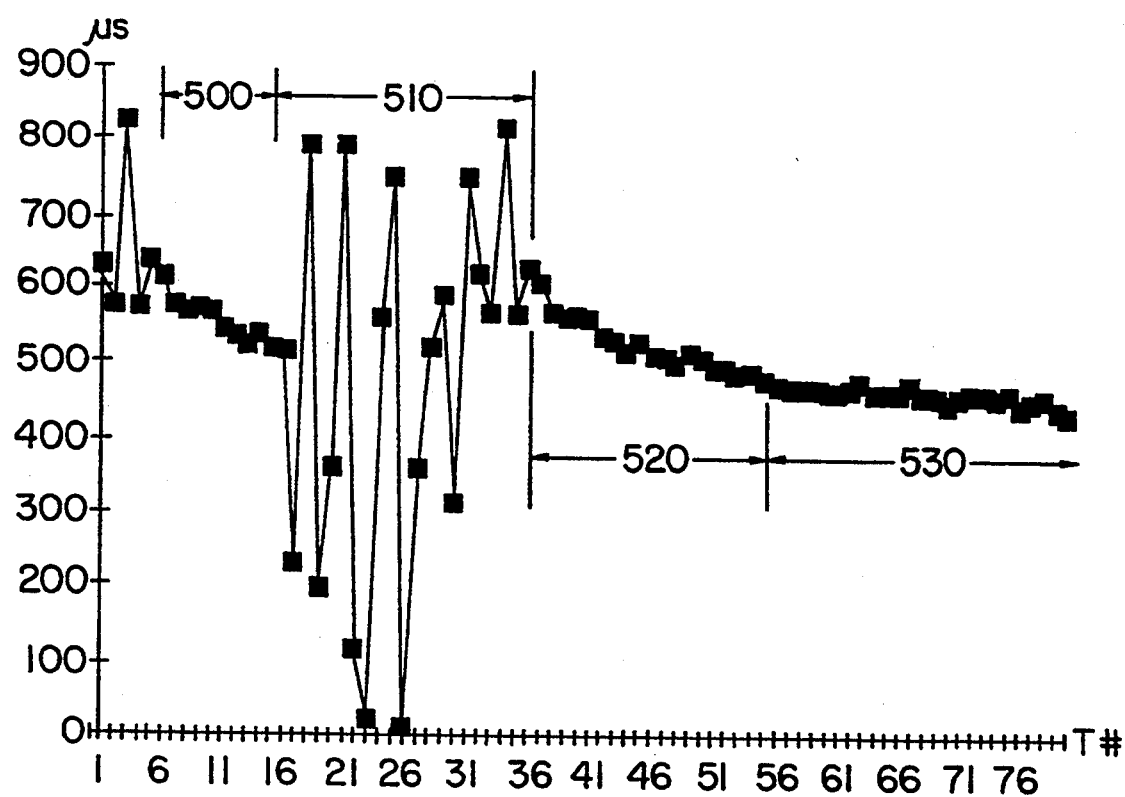
FIG. 9 illustrates an exemplary graph of difference pulse periods related to radiation reflected off a golf ball correctly struck by a golf club.
Figure 10:
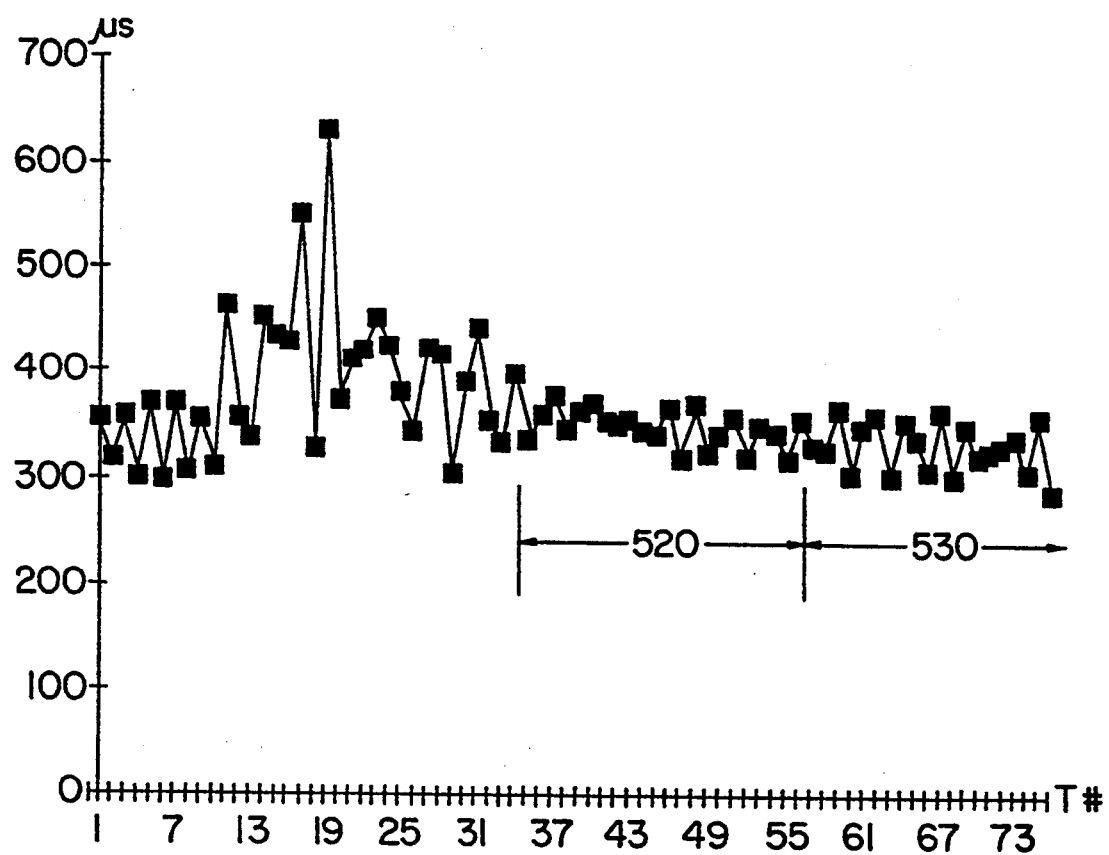
FIG. 10 illustrates an exemplary graph of difference pulse periods related to radiation reflected off a golf ball mis-struck by a golf club.

FIGS. 8–10 illustrate characteristic data which could be fed into queue 250 and subsequently processed by microprocessor 36. FIG. 8 depicts a series of measurements of difference pulse periods for a moving object within the range of apparatus 10. In this case, the object reflecting radiation from the Gunn unit 38 was not struck by the user of the device. Therefore, the curve is essentially smooth and does not contain data indicative of the club-head moving through the hitting area. Microprocessor 36 would compare these data points to its programmed function regarding the motion of a club-head moving through the hitting area and recognize that the object which has been detected was not struck by the user of the apparatus 10. Therefore parameters regarding its motion would not be displayed.

Alternatively, FIG. 9 represents data from a ball properly struck by the user of apparatus 10. Section 500 includes data points illustrative of the beginning of a golfer's backswing. Section 510 includes data points of random noise while the golfer is at the top of his backswing and until the club-head reenters the range in which Gunn unit 38 is transmitting radiation. Section 520 includes data indicative of the motion of a club-head as it moves through the hitting area and out of the range of apparatus 10 on the follow-through. In effect, section 520 includes data representative of both the club-head and the initial motion of the ball away from starting position 18. Section 530 includes data representative of the motion of the ball alone, after the club-head has been moved out of the path of the transmitted radiation by the golfer's natural follow-through. Queue 250 is large enough to store data points from both section 520 and 530. Therefore, when microprocessor 36 processes the data in queue 250, it will recognize the characteristic curve of the club-head and ball in section 520 and determine that the data does relate to a ball struck by the user of apparatus 10. Microprocessor 36 will then average some or all of the values in section 530 to obtain an average difference pulse period and use the average period to calculate a projected carry distance.

Club-head speed may also be measured from data in section 520. Using data empirically derived from curves produced by club-heads moving at known speeds, the portion of section 520 which is indicative of club-head speed can be determined. That is, the portion of section 520 which contains period values which can be translated into velocities which approximate the known speed of the club-head can be experimentally determined. It has been found that approximately the last 25 percent of section 520 relates to the club-head as it moves essentially directly away from the face of apparatus 10. Therefore, the periods or average of the periods (which are indicative of Doppler shift and therefore velocity) in the last 25 percent of section 520 can be used by microprocessor 36 to calculate club-head speed. Note, if apparatus 10 is placed directly behind starting position 18, since the club-head is essentially moving directly away from the face of apparatus 10, the calculated speed is essentially a true velocity rather than a relative velocity. However, it is recognized that any portion of the data points in section 520 may be used to calculate club-head speed as long as the same portion of data points in section 520 is used in each calculation. The calculations may then be adjusted according to the empirically derived data points on the same portion of the curves produced by club-heads moving at known speeds.

In addition, the angle of trajectory of the golf ball can be calculated from the slope of the curve in section 530 as this represents the change in relative velocity over time. In one embodiment of the present invention, an empirical database is provided to relate the slope of the curve defined by the data in section 530 to angle of trajectory. The database is created by plotting the periods of difference pulses as in FIG. 9 for golf shots hit at known trajectories, then relating the known trajectories to corresponding slopes of the curve in section 530.

It is also recognized that the data in section 500 could be used in conjunction with data in section 520 to gain valuable information as to swing tempo. Swing tempo is defined as the ratio between club-head speed on the down-swing and club-head speed on the backswing. Ideally, swing tempo should be about three-to-one for an average golfer. In order to determine swing tempo, microprocessor 36 may be programmed to process information in queue 250 whenever it is full and contains data characteristic of both backswing (section 500) and downswing (section 520) regardless of the number of exceptions caused by section 510. Club-head speed could be determined for both backswing and downswing as described above, and swing tempo may then be calculated as the ratio between the two club-head speeds.

FIG. 10 illustrates characteristic data points of a ball mis-hit by the user of apparatus 10. An irregular spin on a ball, such as a severe slice or hook, can cause oscillation in the periods of difference pulses as shown. Note that thresholds in queue 250 can be set such that despite the oscillation, these data points are considered valid and processing can be initiated. In this case, microprocessor 36 would again recognize the somewhat altered characteristic curve of the club-head and ball in section 520, however, the oscillation of data points in section 530 would cause it to display a "Mis-hit" before calculating parameters as best it can ascertain.

Figure 12:
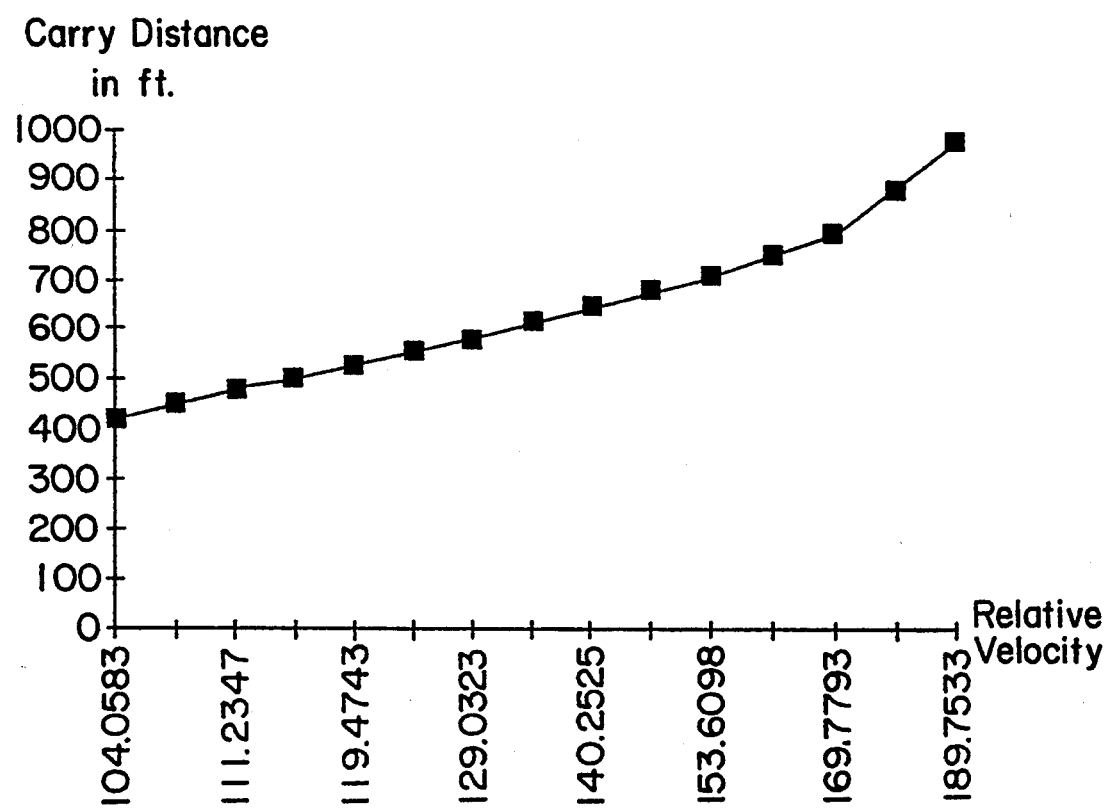
FIG. 12 illustrates an exemplary graph of the relationship between relative velocity of a golf ball as measured by the apparatus and projected carry distance.

FIGS. 11 and 12 illustrate part of the characteristic curves relating the periods of difference pulses (and relative velocities) to constants used to calculate carry distance. These curves were empirically developed by measuring the carry distances of balls struck with different relative velocities. The average carry distance for a particular relative velocity was multiplied by the corresponding difference pulse period to calculate an appropriate constant. FIG. 11 is a graph of these calculated constants versus the difference pulse period values in microseconds. Note that between 190 us and 300 us the curve of FIG. 11 is almost linear. However, the curve increases logarithmically for periods of less than 190 microseconds and decreases logarithmically for periods greater than 290 microseconds. A function may be developed which approximates the curve of FIG. 11 with a linear relationship for periods between 190 microseconds and 290 microseconds and appropriate logarithmic relationships on either end of the curve. This function is programmed into microprocessor 36.

FIG. 12 illustrates the same data as FIG. 11 except that the constants have been correlated to corresponding carry distance values and the difference pulse periods have been correlated to corresponding relative velocities. It should be noted that these values were calculated assuming that apparatus 10 will be disposed at an angle of 10 degrees relative to level ground.

It will be appreciated that the trigger circuitry 64 and microphone 30 shown in FIG. 2 are not necessary in this embodiment as the transmitter 38 and signal generator 40 may be left on continuously. However, it is recognized that in order to save power some method of turning off Gunn unit 38 and signal processor 40 may be employed. For example, each time microprocessor 36 determines that the data in queue 250 contains data characteristic of the motion of a club-head and ball, a signal could be sent to turn off Gunn assembly 38 and signal processor 40. Also, a timer could be initiated which would turn Gunn assembly and signal processor 40 back on after a preset time (it usually takes at least ten seconds for a golfer to be ready for another shot). In addition, the expiration of the preset period on the timer could turn on an indicator light to let the golfer know that apparatus 10 is ready again.

Although the present invention has been described in detail, it should be understood that various changes, substitutions and alterations can be made herein without departing from the spirit and scope of the invention as defined by the claims set forth herein.

What is claimed is:

1. An apparatus for determining a parameter regarding the motion of a golf ball struck by a golf club held by a golfer, comprising:
   a) means for transmitting radiation at a first frequency into the expected path of said golf ball;
   b) means for receiving a portion of said transmitted radiation reflected off of at least said golf ball after said golf ball has been struck by said golf club, said received radiation having a second frequency;
   c) means, coupled to said receiving means, for generating a sequence of difference pulses having durational periods substantially proportional to the reciprocals of corresponding frequency differences between said transmitted first signal frequency and said received second signal frequency, wherein at least a portion of said durational periods are substantially proportional to the velocity of the moving golf ball;
   d) means for determining values corresponding with the periods of said difference pulses;
   e) means for using said values to determine the parameter.

2. The apparatus of claim 1, wherein said determining means comprises a processor coupled to said generating means.

3. The apparatus of claim 2, wherein said means for using comprises said processor.

4. The apparatus of claim 1, wherein said means for using comprises:
   a) means for averaging said determined values;
   b) means for storing a predetermined function to relate said average value to said parameter;
   c) means for calculating said parameter using said average value and said predetermined function.

5. The apparatus of claim 1, further comprising a memory for storing the determined parameter.

6. The apparatus of claim 1, further comprising means for activating said means for using after said golf ball is struck by the golf club.

7. The apparatus of claim 6, wherein said means for activating comprises means for determining which of said values are proportional to the velocity of said moving golf ball.

8. The apparatus of claim 7, wherein said means for activating further comprises means for ascertaining which of said values are proportional to the velocity of the golf club as it strikes said golf ball.

9. The apparatus of claim 6, wherein said means for activating comprises means for comparing said values to an empirically derived function to determine whether at least a portion of said values are proportional to the velocity of said golf club.

10. The apparatus of claim 1, further comprising an acoustic trigger for activating said means for using when said golf club strikes said golf ball and for deactivating said means for using after a preset period of time.

11. An apparatus for determining a parameter regarding the motion of a golf ball struck by a golf club held by a golfer, comprising:
   a) means for transmitting a plurality of radiation pulses comprising a first signal at a first frequency into the expected path of said golf ball;
   b) means for receiving a portion of said transmitted radiation pulses reflected off of said golf ball and said golf club, said received radiation pulses comprising a second signal;
   c) means, coupled to said means for receiving, for determining frequency differences between said transmitted first signal and said received second signal, wherein at least a portion of said frequency differences are substantially proportional to the velocity of said golf ball;
   d) means for ascertaining which portion of said frequency differences are substantially proportional to the velocity of said golf ball;
   e) means for calculating the parameter using said portion of said frequency differences and a predetermined value.

12. The apparatus of claim 11, further comprising means for generating a sequence of difference pulses having durational periods substantially proportional to the reciprocals of corresponding ones of said frequency differences.

13. The apparatus of claim 12, wherein said means for ascertaining comprises means for comparing values corresponding with said durational periods to an empirically derived function to determine whether at least a portion of said values are proportional to the velocity of said golf club.

14. The apparatus of claim 13, wherein said means for comparing prevents said means for calculating from calculating the parameter if no portion of said values are substantially proportional to the velocity of said golf club.

15. The apparatus of claim 13, further comprising a timer means, dependent on said means for comparing, for deactivating said means for transmitting and said means for generating for a preset period.

16. The apparatus of claim 15, wherein said timer means deactivates said transmitting means and said generating means when said means for comparing determines that at least a portion of said values are proportional to the velocity of said golf club and reactivates said transmitting and generating means after said preset period.

17. The apparatus of claim 13, further comprising means for using said plurality of values corresponding with said portion of said durational periods to calculate club-head speed.

18. The apparatus of claim 13, further comprising means for using said plurality of values corresponding with said portion of said durational periods to calculate swing tempo.

19. The apparatus of claim 12, further comprising:
a) means for determining the rate of change between a plurality of values corresponding with consecutive ones of said durational periods;
b) means for using said rate of change to determine the angle of trajectory of said golf ball relative to level ground.

20. The apparatus of claim 19, further comprising means for calculating the speed of said golf ball from said values and said angle of trajectory.

21. The apparatus of claim 11, wherein said apparatus is positioned substantially behind said golf ball before said golf ball is struck.

22. An apparatus for determining the angle of trajectory of a golf ball struck by a golf club held by a golfer, comprising:
a) means for transmitting radiation pulses comprising a first signal at a first frequency into the expected path of said golf ball;
b) means for receiving a portion of said transmitted radiation pulses reflected off of at least said golf ball after said golf ball has been struck by said golf club, said received radiation pulses comprising a second signal;
c) means, coupled to said receiving means, for generating a sequence of difference pulses having durational periods substantially proportional to the reciprocals of corresponding frequency differences between said transmitted first signal and said received second signal, wherein at least a portion of said durational periods are substantially proportional to the velocity of the moving golf ball;
d) means for determining values corresponding with the periods of said difference pulses;
e) means for determining the rate of change between a plurality of consecutive ones of said values;
f) means for using said rate of change to determine the angle of trajectory of said golf ball relative to level ground.

23. The apparatus of claim 22, wherein said means for using comprises means for relating said rate of change to the angle of trajectory through an empirically derived database.

24. An apparatus for determining a parameter regarding the motion of a golf ball struck by a golf club held by a golfer, comprising:
a) means for transmitting a plurality of radiation pulses comprising a first signal at a first frequency into the expected path of said golf ball;
b) means for receiving a portion of said transmitted radiation pulses reflected off of said golf ball, said received radiation pulses comprising a second signal;
c) means, coupled to said means for receiving, for determining frequency differences between said transmitted first signal and said received second signal, wherein, at least a portion of said frequency differences are substantially proportional to the velocity of said golf ball;
d) means for calculating the parameter using said portion of said frequency differences and a predetermined function;
e) trigger means for activating said means for calculating when said golf club strikes said golf ball.

25. An apparatus as recited in claim 24, wherein said trigger means comprises:
acoustic trigger means which is activiated via a sound created by said golf club striking said golf ball.

26. An apparatus as recited in claim 24, wherein said trigger means comprises:
means for determining whether said portion of said frequency differences which are substantially proportional to the velocity of said golf ball are preceded by a plurality of frequency differences which are proportional to the velocity of said golf ball.

27. An apparatus as recited in claim 24, wherein said trigger means comprises:
electric sensor means, including:
a radiation transmitter,
a receiver for receiving radiation from said radiation transmitter, and
means for sensing when said receiver ceases to receive radiation from said radiation transmitter;
wherein said radiation transmitter and said receiver are positioned such that when said golf ball is struck, it passes between said radiation transmitter and said receiver thereby preventing at least a portion of said radiation transmitted by said radiation transmitter from being received by said receiver.

* * * * *